United States Patent [19]

Rackley et al.

[11] 4,342,052
[45] Jul. 27, 1982

[54] MULTIPLE IMAGE FACSIMILE

[75] Inventors: Darwin P. Rackley; Timothy L. Schneider, both of Longmont; Milton H. Woodward, Boulder, all of Colo.

[73] Assignee: International Business Machines Corporation, Armonk, N.Y.

[21] Appl. No.: 159,740

[22] Filed: Jun. 16, 1980

[51] Int. Cl.³ .............................................. H04N 1/38
[52] U.S. Cl. ..................................... 358/287; 358/256; 358/280
[58] Field of Search ........................ 358/256, 280, 287

[56] References Cited

U.S. PATENT DOCUMENTS

| | | | |
|---|---|---|---|
| 3,109,888 | 11/1963 | Moe | 358/287 |
| 3,233,037 | 2/1966 | Foll | 358/257 |
| 3,272,918 | 9/1966 | Koll et al. | 358/287 |
| 3,280,252 | 10/1966 | Lilien et al. | 358/256 |
| 3,541,245 | 11/1970 | Wilby | 358/280 |
| 3,582,549 | 6/1971 | Hell et al. | 358/275 |
| 4,054,914 | 10/1977 | Fukuoka | 358/256 |
| 4,075,663 | 2/1978 | Wellendorf | 358/283 |
| 4,124,871 | 11/1978 | Morrin | 358/287 |
| 4,163,605 | 8/1979 | Yamada | 358/287 |
| 4,170,414 | 10/1979 | Hubert | 355/14 |

*Primary Examiner*—Howard Britton
*Attorney, Agent, or Firm*—Homer L. Knearl

[57] ABSTRACT

The apparatus shown herein controls a facsimile system to reduce four source documents and print all four reduced copies on a single copy page. The facsimile system prints one of the source documents in each quadrant of the copy document. The images of the source documents are reduced in the horizontal dimension by discarding every other picture element in the scan image. The images are reduced in the vertical dimension by increasing the scanner speed so that the size of the picture element in the vertical dimension is doubled. At the receiver, two scanned and reduced images will be printed on the left-hand half of the copy document. Subsequently, two additional scanned and reduced images are printed on the right-hand half of the copy document. When printing the right-hand half of the copy document, the printer must be referenced to start printing at the horizontal mid-page of the copy document rather than the left-hand edge of the copy document.

19 Claims, 15 Drawing Figures

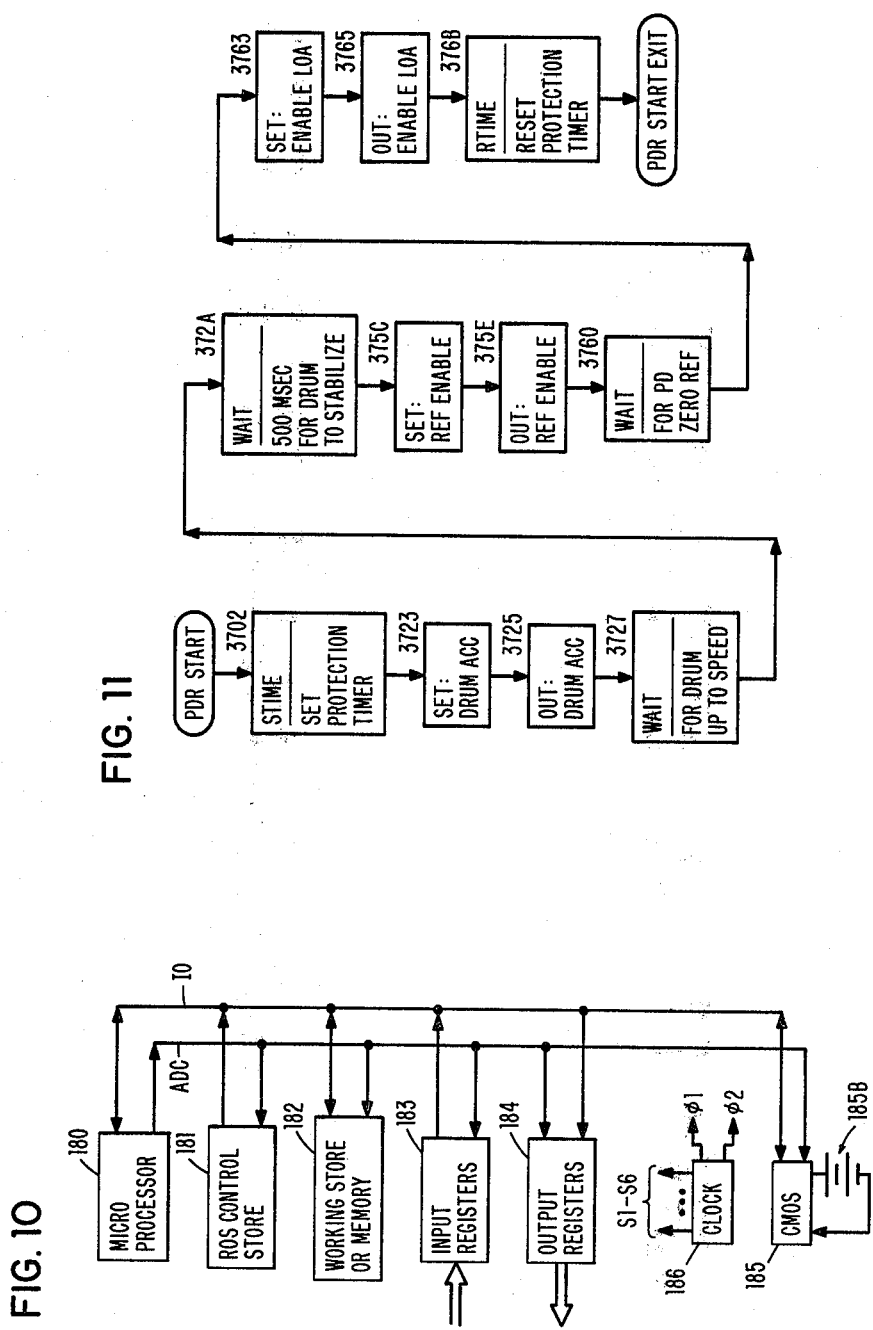

MULTIPLE IMAGE FACSIMILE

DESCRIPTION

FIELD OF THE INVENTION

This invention relates to a facsimile system for transmitting data for multiple documents and printing all the documents on a single page at the receiver. More particularly, the invention relates to reducing the copy of each of the original documents so that a copy of all the documents may be printed on a single page at the receiver.

BACKGROUND ART

In facsimile transmission, the largest operating cost is typically the cost of transmission time over the communication link. This problem is usually addressed by compressing the video data before it is transmitted. Another more hidden cost in facsmile transmission is the time consumed by the facsimile receiver in producing the finished copy of the transmitted image. This hidden cost shows up in the cost per copy of operating the system. To reduce the per copy cost of the facsimile system, it is very desirable to increase the system's throughput (number of documents processed per unit time).

These problems may be attacked by reducing the amount of raw video data from the scanner and by printing reduced copies of multiple originals on a single page at the printer. By reducing the amount of raw video data to be processed, the transmission time is greatly reduced. By printing multiple, reduced copies on one page at the receiver, the apparent resolution is maintained, despite a reduction in video data, and the throughput of the facsimile system is substantially increased. However, apparatus for producing multiple reduced copies on one copy page in a facsimile system does not exist.

Changing the size of the printed image at a receiver relative to the scanned original at the transmitter is well known. Some of the older techniques for doing this used mechanical linkages or variable speed motors to change the magnification or reduction ratio between the copy and the original. U.S. Pat. Nos. 3,109,888 and 3,582,549 are examples of such machines.

Size variation between copy and original in facsimile systems can also be accomplished with electronics. There are two types of electronic reduction systems. The first changes the rate at which data is read into and out of a video data storage device. The size change corresponds to the ratio between the frequencies at which data is loaded into and out of the storage device. Examples of machines in this category are shown in U.S. Pat. Nos. 3,272,918, 3,541,245, 4,054,914, and 4,163,605.

The second type of electronic reduction system changes the copy size relative to the original by processing the video data from each picture element (pel) according to video enhancement algorithms. These video data processing systems shrink or extrapolate the print data from the scanned video data. U.S. Pat. Nos. 4,075,663 and 4,124,871 teach such video data processing systems. Even though changing the size of the copy relative to the original is well known, none of the above patents address the problem of producing multiple reduced copies on a single page. There is one U.S. Pat. No. 3,280,252, which teaches scanning multiple originals at a transmitter and engraving their copies on one drum at the receiver. However, there is no reduction in size between the copy and original. If there are two originals on individual scan drums at the transmitter, the engraving drum at the receiver has a diameter twice that of the scan drums and uses two engraving heads. Accordingly, this patent operates in a manner different from the present invention and does not address the problem of printing multiple reduced copies on a single page.

One U.S. Pat. No. 3,233,037, does teach reducing the scanned image of two originals and printing them side-by-side on a single copy document. This patent relates to merging two weather maps. Both weather maps at the sending station are scanned simultaneously. The transmission signal is switched between scanners so that data from one scanner is sent for one line and data from the second scanner is sent for the next line. Alternate lines in each scanned image are dropped out. At the receiver, the print head is operated at half speed. When the alternating lines of transmitted data from both images arrive, one image line is printed on the left half of the copy document and the second image line is printed on the right half of the copy document. This patent does not address the practical problems of printing multiple reduced images at a facsimile receiver based on successive scanned images.

SUMMARY OF THE INVENTION

It is the object of this invention to produce multiple reduced copies on a single page in a facsimile system from a series of reduced scanned images without substantially sacrificing the visual quality of the printed copy.

In accordance with this invention, the above object has been accomplished by decreasing the amount of raw video data transmitted after scanning a series of original documents and by printing a series a reduced size copies of the originals on one copy page at the printer. Each copy is sufficiently reduced so that the absence of video data is not apparent and so that the copies of multiple originals may be placed on a single copy page the same size as the original page.

The amount of raw video data is reduced by increasing the effective size of the pel quantified into video data. This may be accomplished by increasing relative speed between the original document and the scanner or by skipping part of the data available to the scanner. Preferably, in the horizontal dimension, every other pel of data is discarded, and in the vertical dimension, the scan speed is increased to twice the normal resolution speed.

At the printer, there is no change in the speed of the print head relative to the copy page. However, since a portion of the data in both the horizontal and vertical dimensions is not present, the effect is to print the copy in a fraction of the space previously required. The printer is controlled to start printing each reduced image, as it is serially received, at a different location on the copy page. The visual quality of the copy is very good because the reduction in size compensates for the reduction in video data.

Throughput is increased by printing multiple sequentially received copy images on one copy page. If desired, the print copy may be scanned multiple times by the print head with the print head printing successive scanned images during each scan. Typically, a 4-UP copy of four originals is printed by placing the successive images of the originals in successive quadrants of the copy page. The printing is done in two passes with two successive images printed in each pass.

The great advantage of our invention is that data transmission time is reduced and throughput increased without substantially sacrificing copy quality and without adding cost to the facsimile system. By reconfiguring the system to process less video data and to print more copies on one page, the invention can be implemented with little or no additional cost to the facsimile systems.

BRIEF DESCRIPTION OF THE DRAWINGS

FIG. 10 shows the microprocessor system that provides commands to supervise the operation of the apparatus of FIG. 2.

FIG. 11 shows the flowchart of the Print Drum Start program routine.

DETAILED DESCRIPTION

Figure 1:
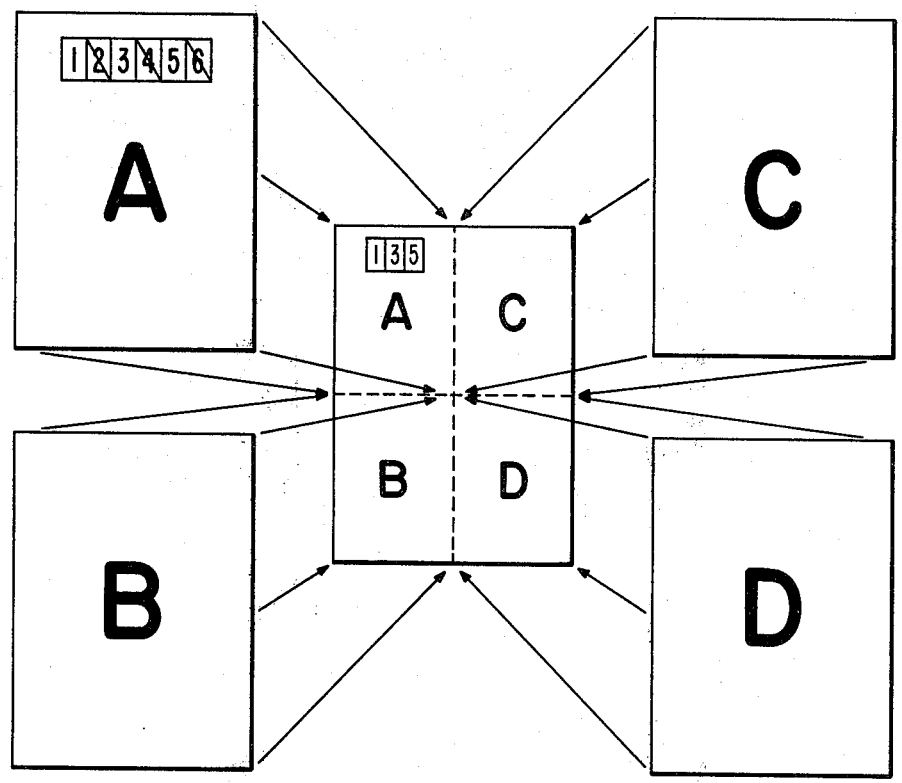
FIG. 1 is a pictorial representation of reducing four original documents onto one print page as accomplished by the present invention.

In FIG. 1, there is a pictorial representation of one result that could be produced by the invention. Four original documents A, B, C, and D are scanned and electronically reduced and printed on four quadrants of a copy page. To print such a 4-UP copy, the video data is reduced by 50% in the horizontal and vertical dimension at the scanner or sending station. The horizontal reduction is accomplished by throwing away alternate bits in the horizontal scan lines. This is depicted in FIG. 1 at document A where video data bits 1 through 6 are scanned and video data bits 1, 3 and 5 are transmitted and printed on the copy page.

To shrink the data in the vertical dimension, the scan pel size is twice the height of the print pel size where a pel is a picture element. This may simply be accomplished by control of the speed or sampling time of a scanner sweeping in the vertical dimension.

At the receiver, the print head and receiver may be driven in the normal mode of operation. As the printer sweeps vertically down the copy page, the first two scan images, documents A and B, are printed on the left-hand side of the page. Because the video data is reduced, the printer just prints on half of the copy document.

To print on the other half of the copy page, the print head makes a second pass across the document and treats the horizontal middle of the copy document as the left-hand edge. During this second pass, the images of original documents C and D are printed. since all documents were reduced by 50% in each of the horizontal and vertical dimensions, the printer has printed a 4-UP copy of the original four documents in two sweeps down the copy page.

Figure 2:
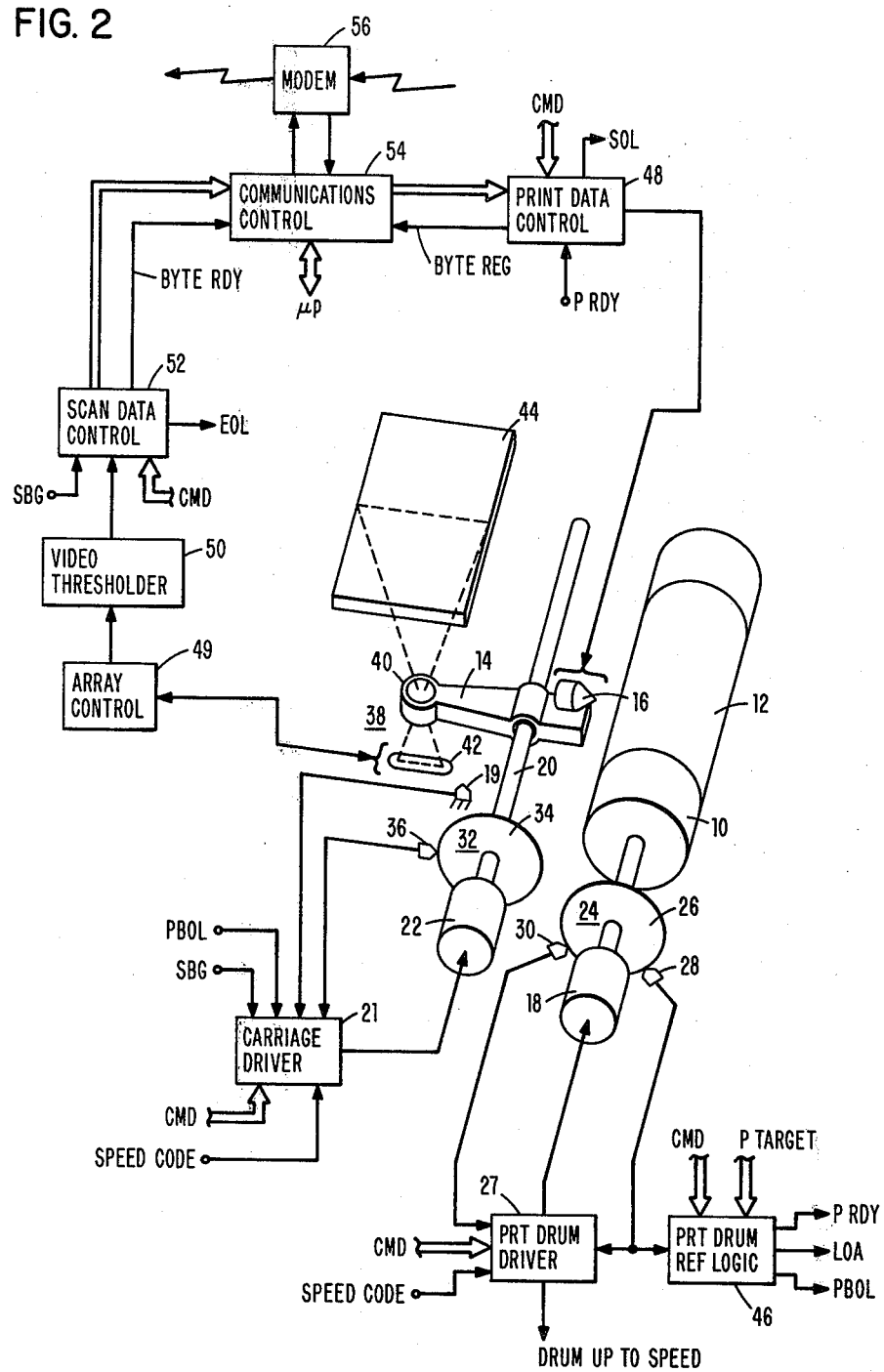
FIG. 2 shows the preferred embodiment of the invention.

In FIG. 2, a preferred embodiment of apparatus capable of producing the result of FIG. 1 is shown. This apparatus utilizes a single nozzle ink jet printer printing on a rotary drum and a linear array scanner scanning across a flat document glass. Print drum 10 carries the copy document 12. The drum rotates while the carriage 14 carries the ink jet print head 16 down the length of the copy document 12.

The print drum 10 is rotated by a motor 18. The carriage 14 is driven by a lead screw 20 which is, in turn, rotated by a motor 22. Motion of the print drum 10 is monitored by the tachometer 24 which consists of an optical grating disc 26 and two optical sensors 28 and 30. Similarly, linear motion of the carriage 14 is monitored by a tachometer 32 driven by the lead screw 20. The tachometer consists of an optical grating disc 34 and an optical sensor 36.

Carriage 14 also carries the scanning mechanism 38 for the flat bed scanner. The scanning mechanism consists of a lens 40 and a CCD array 42. The housing, which fastens lens 40 and array 42 to carriage 14, is not shown. As the carriage 14 moves, the array 42 will scan a document placed on document glass 44 line by line.

Carriage driver 21 energizes the carriage motor 22 which rotates the lead screw 20. Driver 21 controls the start, stop and forward/reverse drive of the carriage at the beginning and end of a scan or print page.

A home position sensor 19 provides a start position reference point for the motion of the carriage 14. Between scans across the page, carriage 7 is in a idle or rest position adjacent the tachometer disc 34. When the carriage begins to move, it crosses home sensor 19. Sensor 19 generates a "home" position reference signal for the carriage driver 21.

Clock signals for controlling the speed of the carriage are derived from a master clock. The carriage clock signal derived from the master clock to control the speed of the carriage is selected by a Speed Code signal applied to the carriage driver 21. The carriage driver also receives a Print Beginning of Line (PBOL) signal or a Scan Begin (SBG) signal to coordinate the motion of the carriage with the motion of the print drum 10 or the gating of signals from the array 42.

The print drum speed is controlled by the print drum driver 27. The driver also receives the master clock signal. In accordance with a drum clock signal selected by a Speed Code, driver 27 drives the print drum motor 10 to rotate the print drum at the desired speed.

In addition to the print drum driver 27 in FIG. 2, print drum reference logic 46 monitors the signal from the drum tachometer 24 and generates position and timing signals used by other apparatus in the invention. For example, the print drum reference logic generates a Print Ready (P RDY) signal which is used by print data control 48 to control the print head. Also, the print drum reference logic generates the DOA signal used by the carriage driver 21 to coordinate the motion of the print head with the motion of the print drum. The Lost Once Around (LOA) signal is simply an error check on the drum once around signal and will be described hereinafter with reference to FIG. 5.

Additional inputs to the reference logic 46 are commands from a supervisory microprocessor and a Print Target signal also from the microprocessor. The Print Target signal is used by the reference logic to generate the Print Ready signal. In one case, the Print Target signal is set up so that the Print Ready signal is generated as the left-hand margin of the paper sweeps past the print head. In a second instance, the print target is set up to cause generation of the Print Ready signal when the horizontal mid-point of the print document 12 sweeps past the print head. All of these functions are described in more detail herein with reference to FIG. 5.

All of the above apparatus described for FIG. 2 relates to motion control during the scanning and printing operations. Now referring to the upper left-hand portion of FIG. 2, the data flow for the preferred embodiment of the invention will be described.

The data flow starts at the photocell array 42. This array consists of 1,728 photocells and CCD (Charge Coupled Devices) shift registers. Such an array is available from Fairchilds Corporation as the CCD122.

The gating of the analog signals out of the array and the processing of those analog signals before they are digitized is accomplished by the array control 49. Structures for performing this function are well known and form no part of the present invention. Typically, the array control would cause the photocells to dump their collected charge into a CCD register at a given gating interval. Thereafter, the CCD shift register shifts out the analog signals in series. The array control would also include circuits to compensate the array for dark current values or black levels and to compensate the array for variations in gain from cell to cell.

From array control 49, the series of analog signals passes to a video thresholder 50. The function of the thresholder 50 is to make a black/white binary decision based on the analog level from each photocell. Thus, based upon the analog level of a given picture element picked up by a photocell, the picture element is coded as a black or white bit. The video thresholder 50 forms no part of this invention, and any number of thresholding circuits are available. From the video thresholder 50, the series of black/white bits pass to the scan data control 52.

The scan data control 52 converts the serial bits of video data into eight-bit bytes and passes these eight-bit bytes to a communications control 54. In addition, the scan data control 52 performs the function of eliminating every other data bit when the apparatus is in the 4-UP mode of operation. Also, the scan data control monitors the number of bits processed and generates an End of Line signal to indicate the end of each scan line processed. Control commands for the scan data control are provided by a supervisory microprocessor which will be described hereinafter. In addition, the Scan Begin signal (SBG) is a clocking signal derived from the master clock and provided to the scan data control to indicate the beginning of each scan line.

At the communications control 54, the bytes of video data are stored in buffers until a communication link has been made. When the communication link is established, the bytes are transmitted by the modem 56 to the receiving facsimile terminal. The communications control 54 and modem 56 are well known devices and are in no way altered by the apparatus used in this invention. Any number of communications systems for buffering data, compressing data, transmitting and receiving data, decompressing data and transmitting communications instructions might be utilized. For example, communication links using IBM Synchronous Data Link Control can provide the functions of the communications control 54.

When the transmitted video data signal is received at the receiving facsimile terminal, the modem 56 at that terminal demodulates the signal and provides the video data to the communications control 54 at the receiver. The communications control 54 would then buffer the data until the print data control 48 is ready to process the bytes of video data. When the print data control is ready to process each byte, it generates a byte request to the communications control 54. The communications control passes a byte of video data to the print data control 48. The print data control serializes the print data and passes it to the print head 16 for printing on the copy document 12.

The print data control 48 receives a Top of Page (TOP) command from the supervisory microprocessor. This signal indicates the print head is moving and has just crossed the top edge of the copy document. The print data control 48 also receives the Print Ready signal from the print drum reference logic 46. This signal indicates when the printing of a line of data may start on the copy document 12.

Another command that the print data control receives is 4-UP mode. The microprocessor detects the 4-UP mode in control instructions sent over the communication link. Finally, the print data control 48 generates a Start of Line (SOL) signal which is monitored by the supervisory microprocessor to detect the number of lines swept by the print head. From the number of lines swept, the microprocessor can determine the end of page. For a more detailed understanding of the operation of the invention, the details of some of the functional blocks in FIG. 2 will now be described.

Figure 3:
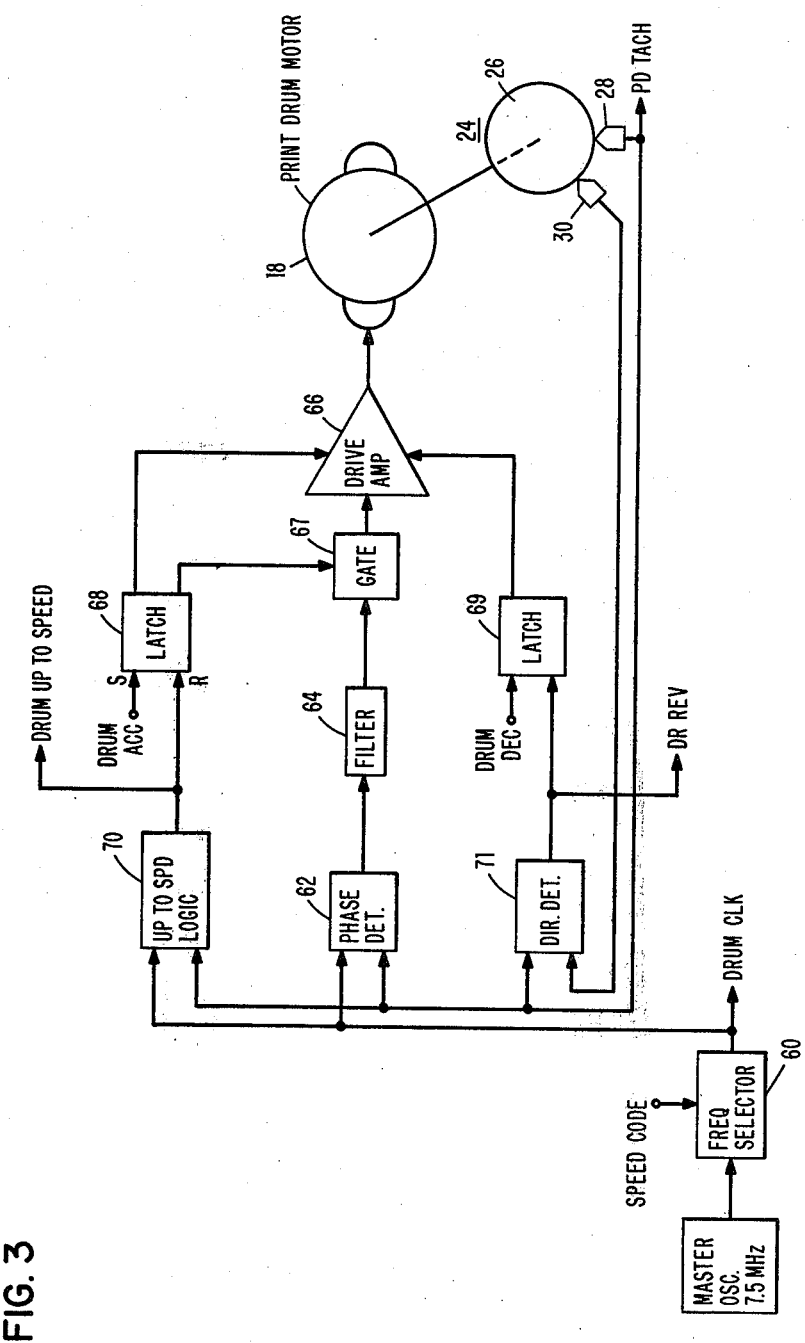
FIG. 3 shows the details of the print drum driver of FIG. 2.

In FIG. 3, the details of the print drum driver 27 of FIG. 2 are shown. The print drum motor 18 drives the print drum during the printing operation. During printing, the high speed motor 18 is synchronized to a selected frequency derived from the 7.5 mHz master clock. The frequency to be used and, thus, the speed of the print drum is selected by frequency selector 60. The Speed Code signal for selector 60 is generated as a command from the supervisory microprocessor.

Locking the speed of the print drum motor 18 to the selected frequency is achieved by phase detector 62. Phase detector 62 receives tachometer pulses from tach sensor 28. The frequency of tachometer pulses indicates the rotational speed of the motor 18. When the print drum motor is up to speed, the phase of these tachometer pulses is compared with the phase of the drum clock signal received from selector 60. Any out-of-phase condition is converted to a DC level by filter 64. The filter also provides some stability to the servo loop. The output of the filter 64 is applied to the drive amplifier 66 through gate 67 to drive the DC motor 18 to reduce the phase error.

Initially, when the motor 18 is being brought up to speed, the motor is driven open loop. There is no feedback from the tachometer through the phase detector to control the motor 18 because gate 67 is not enabled by the reset side of latch 68. Drum motor 18 is started up by an Accelerate (ACC) command from the microprocessor. This command sets latch 68, and latch 68 causes drive amplifier 66 to accelerate the motor 18. During acceleration, the up-to-speed logic 70 monitors the drum clock signal and the tach pulses. During each cycle of the drum clock signal, the trailing edge of a tach pulse is compared to the trailing edge of the clock pulse. As soon as the trailing edge of a tach pulse occurs prior to the trailing edge of a clock pulse, the motor 18 is at the selected speed. Up to speed logic 70 then resets latch 68. Thereafter, gate 67 is enabled so that phase detector 62 controls the drive signal supplied to amplifier 66 as described above. Motor 18 is then driven closed loop and continues to run at the selected speed.

Figure 4:
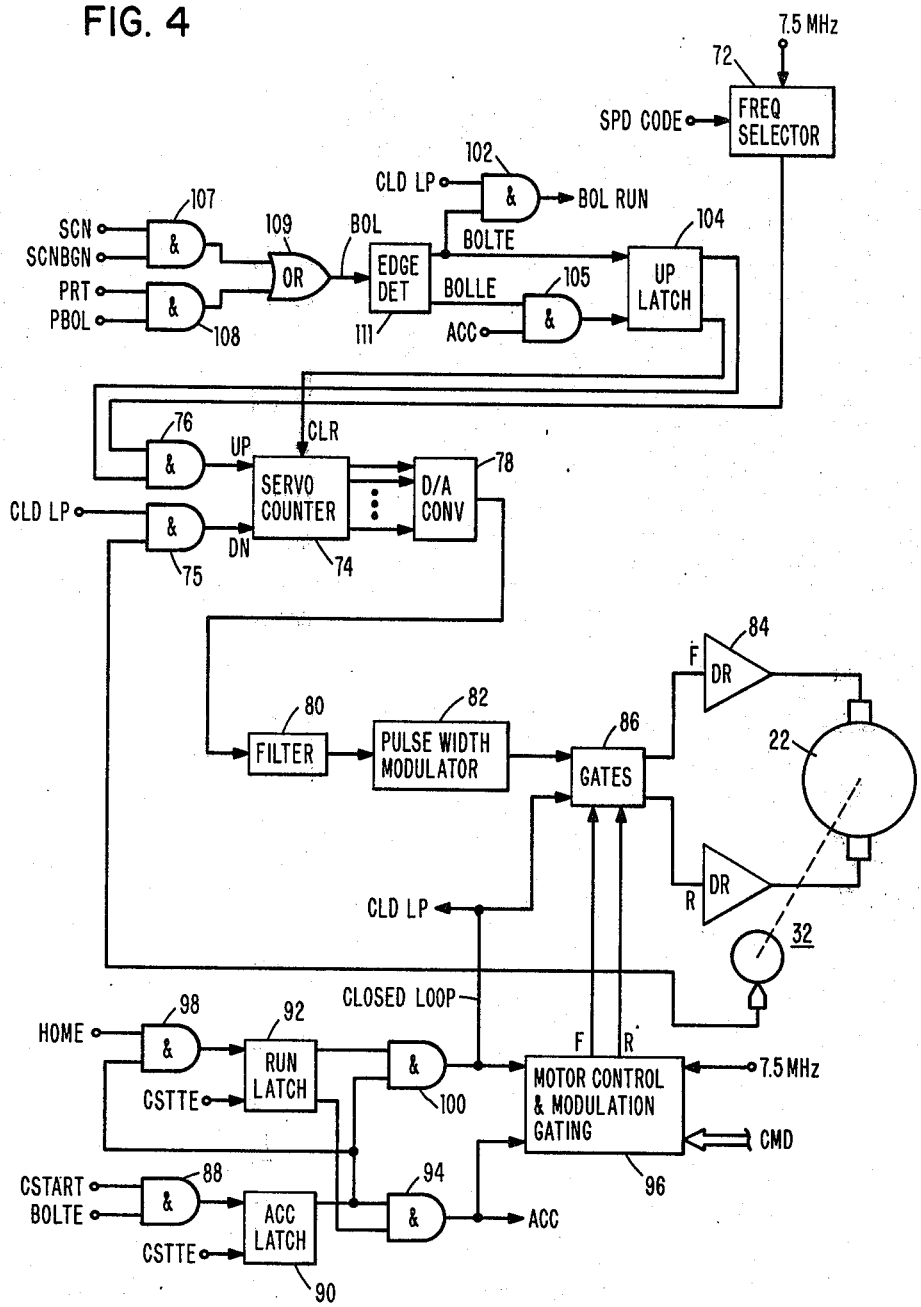
FIG. 4 shows the details of the carriage driver of FIG. 2.

Similarly, as shown in FIG. 4, the carriage drive motor 22 is locked to a selected frequency divided down from the 7.5 mHz master clock. The frequency selector 72 provides multiple carriage clock signals to control the carriage drive motor 22. A Speed Code command from the microprocessor selects the carriage clock signal and, thus, the speed of the carriage. The carriage will have one speed for the print operation and two speeds for the scan operation. The two scan speeds have a ratio of 2:1 so that the vertical resolution may be reduced by a factor of two during 4-UP mode.

The pulses of the Carriage Clock signal are passed to counter 74 by AND 76 to count the counter up. The frequency of tach pulses from tachometer 32 (FIG. 2) give a measure of the rotational velocity of the motor 22. These tach pulses are passed to the counter 74 by AND 75 to count the counter down. When the carriage drive motor is at its desired speed, the count in counter 74 will be a measure of the energy required to keep the motor at the desired speed.

This count is converted to a DC level by a digital-to-analog converter 78 and filter 80. The DC level is used to control the amount of modulation by a pulse width modulator 82. The pulse width modulated signal is passed to drive amplifier 84 by gates 86. Amplifier 84 then drives the carriage drive motor 22 in accordance with the percentage of modulation of the pulse width modulated signal.

Initially, to bring carriage drive motor 22 up to speed, the motor is driven open loop. The start up of the motor is triggered by a Carriage Start command from the supervisory microprocessor. This command sets a latch (FIG. 9), and the latch provides a CST signal as long as it is in a set condition. The latch is reset at the end of the page. When the CST signal goes high, the trailing edge of a Beginning of Line signal (BOLTE) satisfies AND 88 in FIG. 4. AND 88 sets the accelerate latch 90. Run latch 92 is in a reset state as a result of a previous run by the carriage or machine initialization. Therefore, AND 94 passes the accelerate signal from latch 90 to the motor control 96. Motor control 96 gates a full pulse or 100% duty cycle pulse through gates 86 to forward drive amplifier 84. The full pulse drive to motor 22 accelerates the carriage forward.

During startup of the carriage, motor 22 is driven open loop since gates 86 do not pass signals from Pulse Width Modulator (PWM) 82 to drive amplifier 84. The transition to closed loop operation of motor 22 using servo counter 74 starts with AND 98. AND 98 is enabled by the Home pulse from sensor 19 (FIG. 2) and the set condition of accelerate latch 90. When AND 98 is enabled, it sets run latch 92. With the run latch set, AND 94 is inhibited and AND 100 is enabled. The output of AND 100 is the Closed Loop (CLD LP) signal. This signal causes gates 86 to connect PWM 82 to driver amplifier 84 and inhibits motor control 96. At the same time, the Closed Loop signal enables AND 75 to pass tachometer pulses from tach 32 to the servo counter 74. Also, the Closed Loop signal enables AND 102 to pass the next BOLTE pulse to generate the BOL RUN signal.

During the accelerate mode of operation of motor 22, the servo loop is not closed. The servo counter 74 is cleared by the leading edge of the Beginning of Line pulse (BOLLE) and starts to count up after the Beginning of Line trailing edge (BOLTE). AND 105 is conditioned by the Accelerate (ACC) signal from latch 94 and passes each BOLLE pulse to reset up latch 104. The reset condition of latch 104 clears counter 74. The BOLTE pulse sets the up latch 104. Each time the up latch is set, servo counter 74 starts counting up at a rate dependent on the Carriage Clock signal received from frequency selector 72. Thus, during accelerate mode when the servo-loop is not closed, the servo counter starts to count up at BOLTE and is cleared by the next BOLLE.

After the Home sensor 19 (FIG. 2) is crossed by the carriage, the accelerate signal drops and the closed loop signal goes high. The up latch 104 is no longer reset so the servo counter is no longer cleared. AND 75 now passes the tach pulses from tach 32 to count counter 74 down while carriage clock pulses are counting counter 74 up. The servo loop is closed and counter 74 is controlling the speed of the carriage and holding its phase fixed relative to the print drum speed or the scanner array gating frequency.

As discussed previously, the count in counter 74 controls the amount of modulation produced by pulse width modulator 82 to control the speed of the carriage drive motor 22. When the loop settles out, the count in counter 74 will be that necessary to overcome drag in the carriage drive to maintain the speed of the carriage. The loop will settle out before the carriage crosses the top of the page to be scanned or printed.

The Beginning of Line (BOL) pulse is derived from the Print Beginning of Line (PBOL) pulse during printing and from the Scan Begin (SBG) pulse during scanning. The PBOL and the SBG correspond to the beginning of a line in the print mode and scan mode, respectively. Since the counter 74 begins to count up at the last BOL before closed loop mode and begins to count down at the beginning of closed loop operation, the linear motion of the carriage will be locked into a relative position to the rotation of the print drum 10 or the gating of video data for each line from the scan array 42.

The Scan Begin (SBG) signal is simply a clocking signal derived from the 7.5 mHz master clock. The SBG signal is used to gate a line of video data out of the array 42.

Figure 5:
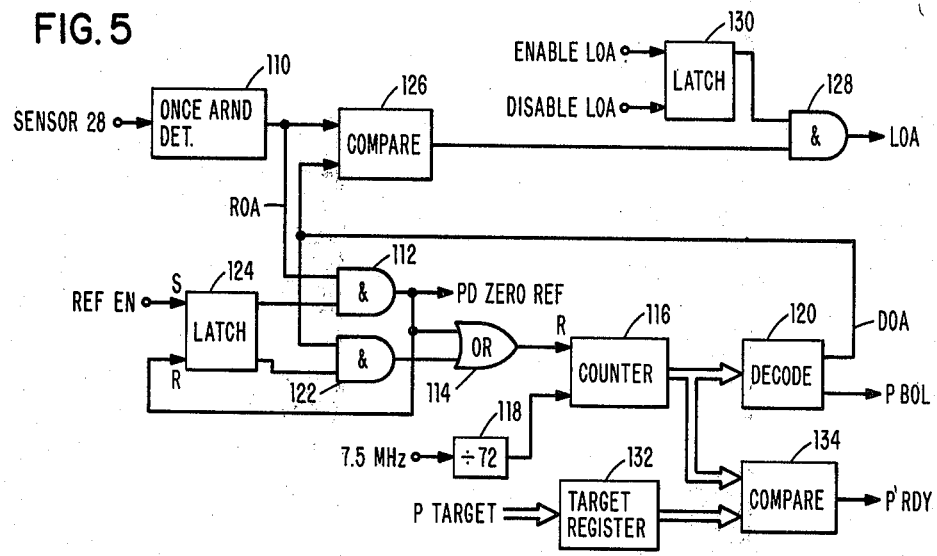
FIG. 5 shows the details of the print drum reference logic of FIG. 2.

A Drum Once Around (DOA) signal is generated by the print drum reference logic 46 (FIG. 2) which is shown in detail in FIG. 5. The DOA signal is derived from a counter rather than being detected from the drum tachometer. DOA is derived in this way because the counter and the drum are locked to the same master clock and because the signal derived from the counter is more stable than the real once around detected from the drum tachometer 24 (FIG. 2).

To generate the Real Once Around (ROA) pulses, print drum tachometer disc 26 has a special mark a predetermined distance from the left edge of the print sheet 3 (FIG. 2). This mark serves as the real once around mark as the drum rotates. Referring now to FIG. 5, the once-around mark is detected by once-around detector 110. When the detector detects the once-around, it passes the ROA pulse through AND 112 and OR 114 to reset a drum counter 116 to zero. Drum counter 116 is counting the picture elements (pels) or ink drop positions across a line on the printed page. The drum pel clock signal, which advances the counter, is derived from the master clock by frequency divider 118. Accordingly, counter 116 is in sync with the drum since the master clock also controls the print drum motor drive. Further, the drum counter 116 has a fixed phase relationship to the drum since it is initialized by the real once around when the drum motor is started up.

To generate the DOA and the PBOL signals, decode 120 monitors the count in the counter 116. When the drum counter counts enough pels to correspond to one revolution of the drum, decode 120 generates the DOA signal. This once-around signal is passed back through AND 122 and OR 114 to reset the counter 116 for a new line. When decode 120 counts enough pels to indicate the left edge of the print sheet, it generates the PBOL signal. This signal is sent to AND 108 (FIG. 4).

Drum counter 116 is reset to start counting pels in a new line by a ROA pulse from detector 110 or by a DOA pulse from decode 120. Whether a real once around pulse or a decoded drum once around pulse is used depends upon the state of latch 124. Latch 124 is set by a Reference Enable command from the supervisory microprocessor when the print drum is started up. With latch 124 set, the first ROA pulse through AND 112 will reset the drum counter to zero and reset latch 124. With latch 124 reset, AND 122 is enabled and counter 116 is reset thereafter by DOA pulses. The Reference Enable command is not issued by the microprocessor until the print drum has settled at its operating speed. Therefore, the ROA pulses and the DOA pulses should be occurring at substantially the same time.

To check that the ROA and the DOA pulses are within a small tolerance interval of each other, compare 126 is used. Compare 126 has an output if these two pulses are more than a few milliseconds apart. An output from compare 126 represents a Lost Once Around (LOA) condition. If AND 128 is enabled, the LOA signal is passed back to the microprocessor so that the microprocessor can abort the printing operation. AND 128 is enabled by latch 130 if the latch is set by an Enable LOA command from the microprocessor. Latch 130 is reset by a Disable LOA command from the microprocessor. In this way, the supervisory microprocessor controls when it wishes to monitor the print drum motion for the Lost Once Around condition.

The print drum reference logic in FIG. 5 also generates the Print Ready (P RDY) signal used by the print data control 48 (FIG. 2). In a print operation, the microprocessor loads a print target (P Target) count into target register 132. The count in counter 116 is compared against the target count in register 132 by compare 134. When there is a match, compare 134 generates the P RDY signal.

In a normal facsimile operation, the P Target count loaded into register 132 would correspond to the left edge of the copy document 12 (FIG. 2). In the 4-UP mode of operation, a different P Target count would be loaded in register 132 for the two successive print passes of document 12. For the first pass, the target count would correspond to the left edge of the document. For the second pass, the target count would correspond to the horizontal midpoint of the copy document. Accordingly, in the 4-UP mode, the printer would print images of two originals on the left side of the document during the first pass and the images of two additional originals on the right side of the document during the second pass.

So far, the details of the motion control apparatus have been described. The 4-UP mode also requires changes to the data flow. In particular, the scan data control 52 and the print data control 48, both of FIG. 2, will now be described showing the apparatus and signals necessary to implement the 4-UP mode.

Figure 6:
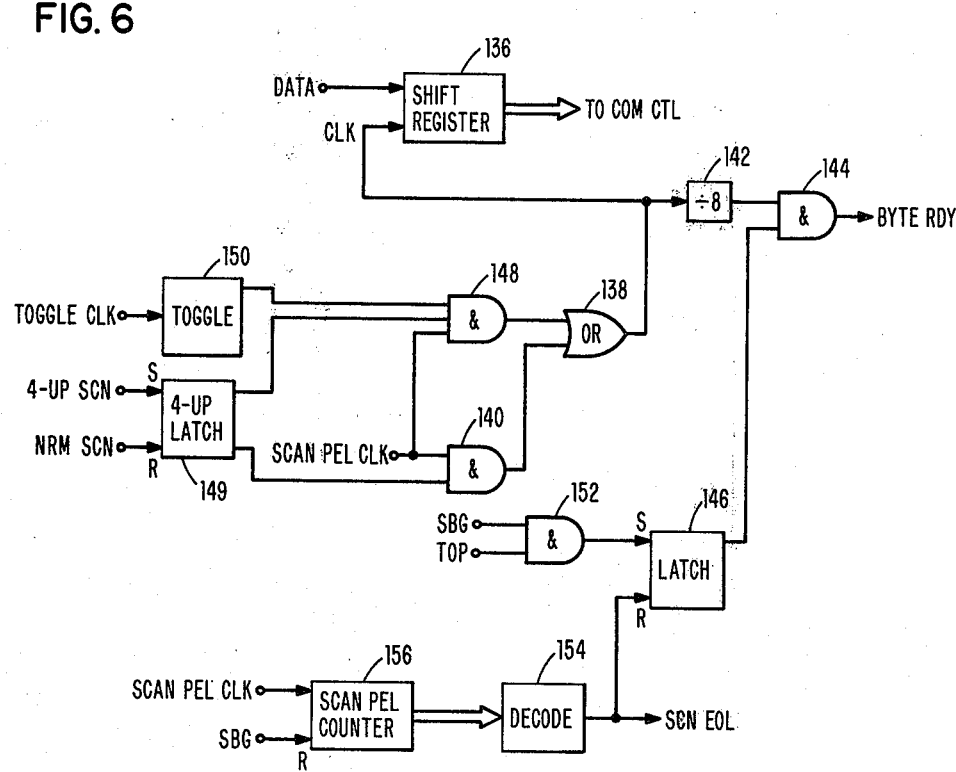
FIG. 6 shows the details of the scan data control of FIG. 2.
Figure 7:
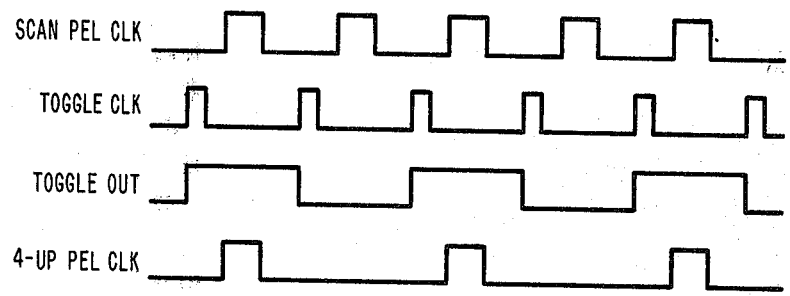
FIG. 7 is a timing diagram showing signals used in the scan data control of FIG. 6.

To better understand the scan data control 52, reference is now made to FIG. 6. A serial stream of video data bits from thresholder 50 (FIG. 2) are deserialized by the eight-bit shift register 136. Data is shifted into the shift register 136 by a clocking signal received from OR 138. In the normal mode of operation, OR 138 receives the clocking signal from AND 140. AND 140 is enabled by the Normal Scan (NRM SCN) command. When enabled, AND 140 passes the Scan Pel Clock signal derived from the master clock. The scan pel clock waveform is shown in FIG. 7.

For every scan pel clock pulse applied to the shift register 136, a new data bit is loaded into the shift register. The data bits coming to the shift register 136 are also clocked with the scan pel clock signal. Thus, there is a one-to-one correspondence between a video data bit and the normal Scan Pel Clock signal shifting the data bits into the shift register 136.

Frequency divider 142 counts the clock signal pulses from OR 138 and generates a Byte Ready signal each time eight bits have been loaded into the shift register 136. The Byte Ready signal is outputted from AND gate 144 when AND 144 is enabled by latch 146. Latch 146 is in a set condition from the beginning of a scan line until the end of the line.

When the scanner is in a 4-UP mode of operation, OR 138 receives the clock pulses from AND 148 instead of AND 140. AND 148 logically combines the Scan Pel Clock signal with a Toggle Output signal which is half the frequency of the Scan Pel Clock signal. This produces a 4-UP pel clock signal at the output of AND 148 which is passed by OR 138 to shift register 136. The Toggle Clock signal, Toggle Out signal and 4-UP pel clock signal are all shown in FIG. 7.

The Toggle Out signal is produced by the toggle circuit 150 in FIG. 6. As is well known, a toggle circuit is like a latch or a flip-flop that changes state each time an input pulse over its single input line is received. The input to the toggle circuit 150 is a Toggle Clock signal derived from the master clock. As shown in FIG. 7, the Toggle Clock signal is the same frequency as the Scan Pel Clock signal but is shifted in phase relative to the Scan Pel Clock signal.

When the 4-UP pel clock signal is applied to shift register 136, only every other video data bit on the data line is loaded into the shift register. Video data bits that occur when the 4-UP pel clock signal is down are simply lost or discarded. Thus, the shift register 136 contains every other data bit as was pictorially represented in FIG. 1 which shows copy document A containing only the odd-numbered data bits from original document A.

The 4-UP pel clock signal is also counted by the frequency divider 142 to produce the Byte Ready signal. The Byte Ready signal will still indicate an eight-bit byte is ready for transfer to the communication control. However, the rate at which they are ready for transfer will be half of the previous rate. Since the communications control 54 (FIG. 2) contains buffers to collect bytes before they are transmitted by the modem, the difference in data rates from the shift register is of no concern. In fact, as discussed earlier, since there will be fewer bytes per original document image, the amount of transmission time required by the communication link will be significantly reduced.

The gating of the Byte Ready signal by AND 144 in FIG. 6 is controlled such that the shift register 136 is unloaded to the communications control only during a scan line. As previously discussed, AND 144 is enabled by latch 146. Latch 146 is set at the beginning of each scan line by the SBG signal if AND 152 is enabled by a Top Of Page (TOP) signal. Latch 146 is reset at the end of line by decode 154. Decode 154 monitors the scan pel counter 156 to detect the end of each scan line. Scan pel counter 156 counts the Scan Pel Clock signal and, thus, counts the pels in a scan line. The scan pel counter is reset by the SBG signal at the beginning of each scan line. Since there are 1,728 photocells in the array 42, decode 154 looks for a count of 1,728 in counter 156 to indicate end of line. Accordingly, latch 146 enables the sending of bytes from the scan data control only between the beginning and ending of a scan line.

As described earlier, the bytes of scan data go to the communications control 54 (FIG. 2) and, through the modem, are transmitted to the receiver. At the receiver, the eight-bit bytes of video data are again buffered in a communication control 54. Print data control 48 deserializes the eight-bit bytes into a stream of video data bits for the print head. A schematic of the print data control 48 is shown in FIG. 8.

The print head driver 160 forms no part of the present invention and would have various configurations depending upon the type of print head used. For example, if the print head is a single ink jet nozzle, the serial data signal out of the print head driver to the print head could be either an ejection signal for a drop-on-demand type print head or a charge electrode signal for a continuous flow-type ink jet head.

To perform its deserializing operation on the video data bytes, the print head driver needs the print pel clock signal. To know when to print, the driver needs the Top of Page signal, the Print Ready signal plus the Start of Line and End of Line signals. The start of line and end of line indications would change in making the switch from a normal mode facsimile machine to a 4-UP facsimile machine.

Figure 8:
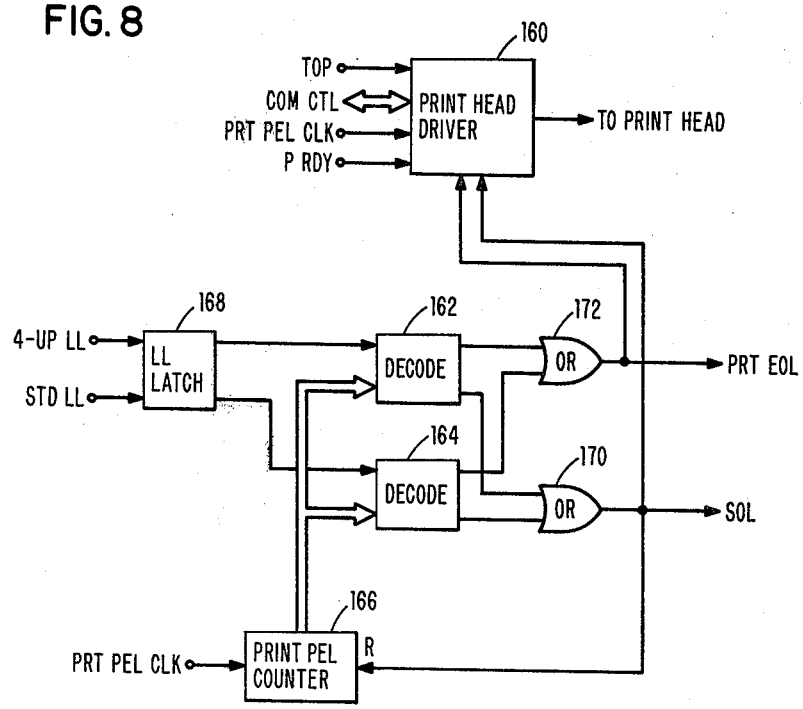
FIG. 8 shows the details of the print data control of FIG. 2.

As shown in FIG. 8, the Start of Line (SOL) signal and the Print End of Line (PRT EOL) signal at the printer are defined by decodes 162 and 164 decoding counts from print pel counter 166. The print pel counter counts print pel clock pulses derived from the 7.5 mHz master clock. When a Start of Line signal is decoded, the print pel counter is reset to zero to count the next line.

Decode 162 is looking for counts specifying an 864 bit line. Such a line exists during the 4-UP mode. Decode 164 is looking for a 1,728 bit line which occurs during the normal one-to-one mode of operation. Whether decode 162 or decode 164 is enabled depends upon line length latch 168. Latch 168 is set and reset by the supervisory microprocessor. During the 4-UP mode, a 4-UP LL signal from the microprocessor sets the mode latch 168. Decode 162 is then enabled to decode the Start of Line signal and End of Line signal for an 864 bit line. The Start of Line signal is passed by OR 170 to the print head driver 160 while the End of Line signal is passed by OR 172 to the print head driver 160.

When the facsimile system is in the normal mode of operation, the supervisory microprocessor will generate a STD LL command which resets the line length latch 168. With latch 168 reset, decode 162 is inhibited, while decode 164 is enabled. Decode 164 will then look for counts indicating a start and end of a normal one-to-one line. The SOL signal from decode 164 is passed by OR 170 to the print head driver, while the EOL signal is passed by OR 172 to the print head driver.

The Start of Line signal (SOL), in addition to being used by the print head driver to build the print line from eight-bit bytes received from the communication control 54, is also sent back to the supervisory microprocessor. The supervisory microprocessor counts the SOL pulses to determine the number of lines swept by the printer. When the number of lines swept corresponds to expected length of the page, the microprocessor will generate an End of Page signal.

The microprocessing system (FIG. 10) used as a supervisor for the apparatus of the invention generates the commands used by the apparatus of FIGS. 2 through 9. The use of some of these commands has already been described. Drum Accelerate and Drum Decelerate set the accelerate latch 68 and the decelerate latch 69 in FIG. 3. Enable LOA and Top of Page enables AND 125 (FIG. 6) to set latch 146 at the beginning of the first scan across the top of the page. In the print operation, Top of Page is used by the print head driver 160 (FIG. 8) to identify when the printing operation can begin. Enable LOA and disable LOA set and reset latch 130 (FIG. 5) to control when the supervisor monitors for the LOA signal. Reference Enable sets latch 124 in FIG. 5 to initialize the drum counter 116 with a real once around. Carriage Start and Last Line are commands used in FIG. 9 to control logic to generate the CST signal.

Figure 9:
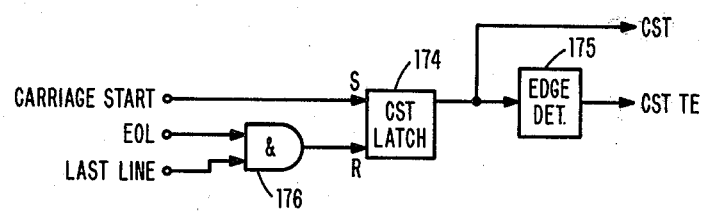
FIG. 9 shows logic to generate some of the control signals used with the carriage driver of FIG. 4.

The Carriage Start signal sets CST latch 174 in FIG. 9. When latch 174 is set, the CST signal is high. If AND 176 is enabled by the Last Line signal, CST latch 174 is reset by the EOL pulse from OR 172 when printing (FIG. 8) or by decode 154 when scanning (FIG. 6). Thus, the CST signal from latch 174 is high while the carriage is moving during a scan or print pass. Edge detector 175 monitors the CST signal and generates a pulse CSTTE when it detects the trailing edge of the the CST signal. This pulse is used in the carriage driver shown in FIG. 4.

The supervisory microprocessor system is shown in FIG. 10. Microprocessor (MP) 180 operates based upon a set of control programs contained in ROS control store 181 and uses working store or memory 182 as a main or working store. MP 180 communicates with the other units of the multiple image facsimile apparatus of FIG. 2 via the input registers 183 and the output registers 184. In a preferred embodiment, the IO bus is eight bits wide (one character). Address signals, selecting which units are to send or to receive signals with respect to MP 180, as well as other units, are provided by MP 180 over a 16-bit ADC. A nonvolatile store CMOS 185 is a battery powered semiconductor memory using CMOS construction and powered by battery 185B. Clock 186 supplies timing signals to units 180–185.

The details of the MP 180 and the manner in which it may be programmed are described in commonly-assigned U.S. Pat. No. 4,170,414 entitled "Document Feed Controls For Copy Production Machines." The same control microprocessing system described therein has been programmed to perform the supervisory functions for the present inventive system. Accordingly, shown and described herein is a flowchart for the supervisory routines with emphasis on the generation of the commands used by the present facsimile apparatus. The program code for generation of the commands is at the end of this description in Appendix B. To assist in understanding the exemplary program in Appendix B, a glossary of program instructions with their definitions is listed in Appendix A in alphabetical order by assembler type mnemonic.

The programming routine, Print Drum (PDR) Start, flowcharted in FIG. 11 generates the commands used to start the print drum motor. The steps of the program flow are labeled with numbers corresponding to the memory location for that program instruction in Table I in Appendix B.

The drive start routine begins by setting a protection timer. A macro routine stored at memory location 3702 is used for this function. The protection timer sets a time-out period for bringing the print drum up to speed and checking its proper operation. After the protection timer is set, the program at step 3723 sets the Drum Accelerate command. Immediately thereafter, the Drum Accelerate command is outputted by step 3725 to latch 68 (FIG. 3).

With the drum accelerating, the program routine enters wait macro 3727. This wait macro waits for an interrupt signal indicating that the drum is up to speed. The drum up to speed indication is provided by the up-to-speed logic 70 (FIG. 3). After the up-to-speed signal is received, another wait macro 372A is used to insert a 500 millisecond wait. This timed wait period is for the purpose of allowing the print drum to settle at its selected speed. After the 500 millisecond wait, step 375C sets a reference enable control byte and step 375E outputs this Reference Enable control signal. The control signal is passed by the output registers 184 (FIG. 10) to the input of reference enable latch 124 (FIG. 5).

The PDR Start routine then enters wait macro 3760 and waits for the print drum zero reference signal passed from AND 112 in FIG. 5. After the print drum zero reference signal is received back via the input registers 183 (FIG. 10), the start routine sets an enable LOA control byte. Immediately thereafter, at program step 3765, the enable LOA control signal is outputted via registers 184. The enable LOA signal sets latch 130 in FIG. 5.

If all of the above steps in the PDR Start routine have been accomplished within six seconds, the RTIME macro at step 376B resets the protection timer. Otherwise, the protection timer will time out and the operation will be aborted or a recovery effort will be made. After the protection timer has been reset, program control exits from the PDR Start routine.

Figure 12:
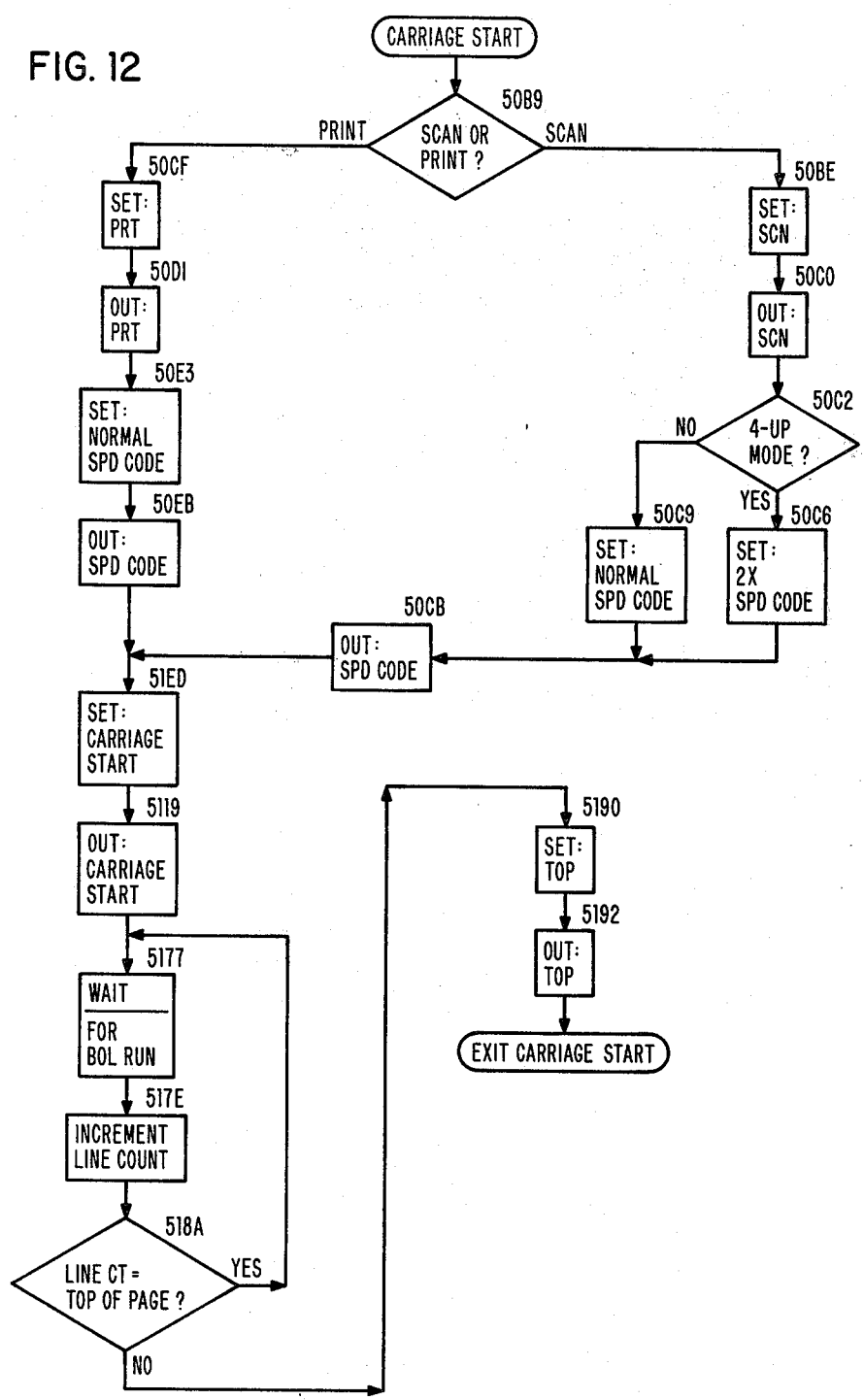
FIG. 12 shows the flowchart of the Carriage Start program routine.

The programming routine, Carriage Start (CSTART), flowcharted in FIG. 12 generates the commands used to control the carriage during a print or scan. The steps of the program flow are labeled with numbers corresponding to the memory location for that program instruction in Table II in Appendix B.

The first step of the Carriage Start routine is to test whether the machine is operating in a scan or print mode. If in a scan mode, program control branches from the decision block 50B9 to the set scan mode step 50BE. The scan mode signal is outputted by step 50C0 through output registers 184 (FIG. 10) to enable the AND gate 107 in FIG. 4. The SCN command generated by the computer would be used to set a latch (not shown) whose set condition would be the SCN signal used by AND gate 107.

After outputting the SCN command, the program routine checks to see if the system is in the 4-UP mode at decision block 50C2. As discussed earlier, this is necessary because the speed at which the scanner moves is twice as fast during a 4-UP scan than it is during a normal scan. If it is 4-UP mode, the routine branches to step 50C6 and sets the twice-normal speed code. If it is not 4-UP mode, the routine branches to step 50C9 and sets the normal speed code. Thereafter, at step 50CB, the set speed code is outputted to the frequency selector 72 (FIG. 4).

If at the beginning of the Carriage Start routine the decision step 50B9 had determined the system was in the print mode, then the routine would have branched to step 50CF. Steps 50CF and 50D1 set and output the Print Mode command (PRT). The PRT command is used to enable AND 108 of FIG. 4 to pass DOA signals to generate the BOL pulse. The PRT command would be used to reset the latch set by the SCN command. With the latch reset, the reset condition of the latch is used to enable AND 108.

In a print mode, the carriage has only one speed. Accordingly, steps 50E3 and 50EB set an output, a normal print speed code, for the carriage. This speed code goes to the frequency selector 72 in FIG. 4.

The program routine after it outputs the speed code, sets and outputs the Carriage Start command at steps 5117 and 5119. The Carriage Start command sets the CST latch 174 in FIG. 9. The CST signal out of the set side of latch 174 is up during the running of the carriage in either a scan or print operation.

The remainder of the Carriage Start routine looks for the top of the page. The top of the page is a given distance from the home signal detected during the start up of the carriage. The supervisory microprocessor waits for a BOL RUN pulse indicating the first BOL signal after the carriage has detected the home sensor. In the programming routine of FIG. 12, the wait macro 5177 looks for the BOL RUN pulse. As soon as the BOL RUN pulse is received, step 517E increments a line counter in the supervisory microprocessor. Step 518A then compares this line count to a predetermined count indicating the top of the page. If the line count is not equal to the top of page, then the routine loops back to wait for the next BOL RUN pulse. Eventually, enough BOL pulses will have been counted to indicate that the scanner or printer should be at the top of the page (a given distance from the home sensor). Then the output of decision step 518A is "yes" and the routine branches to steps 5190 and 5192. These steps set and output the TOP signal. The TOP signal is passed to the print head driver 160 (FIG. 8) and is also used to enable AND 152 in FIG. 6. In both cases, the TOP signal is used to tell the scan and print hardware when it is at the top of the page to be operated on.

Figure 13:
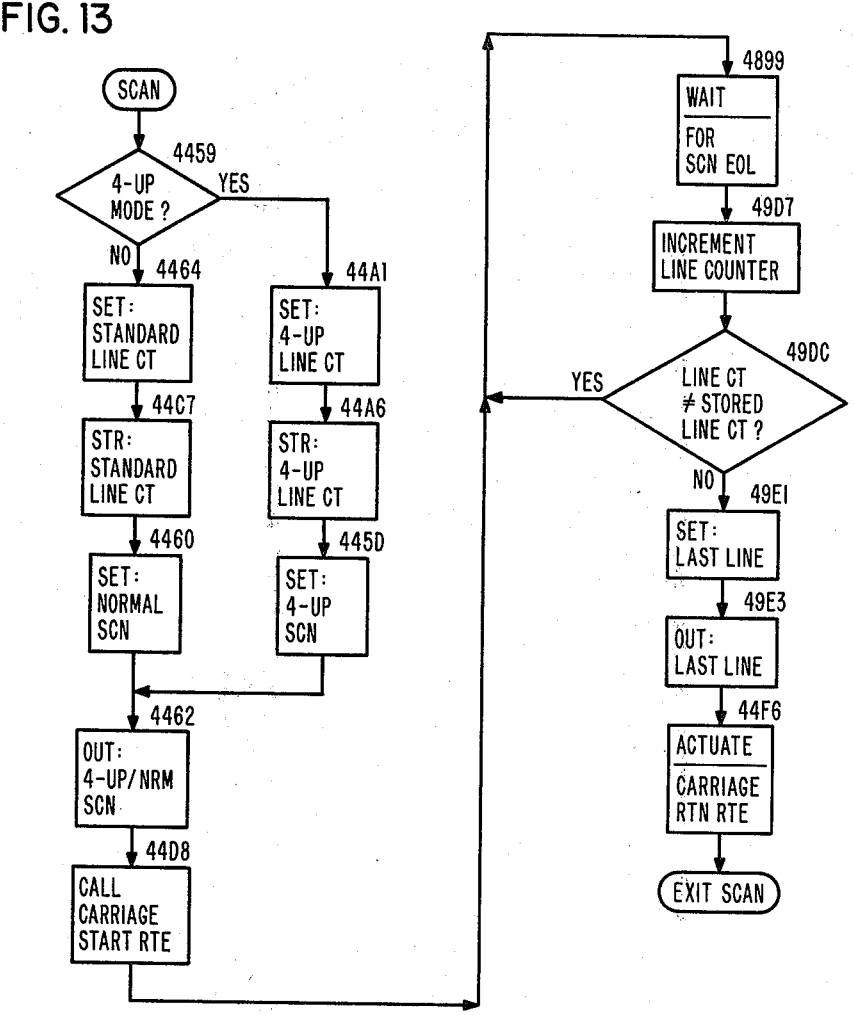
FIG. 13 shows the flowchart of the Scan program routine.

The Carriage Start routine just described is called up by the scan routine or by the print routine whichever is operative. The flowchart of the scan routine is shown in FIG. 13. The exact program instructions represented by the flowchart are in Table III of Appendix B.

The scan routine starts by checking whether the apparatus is in the 4-UP mode. If it is, the program flow branches from decision 4459 to steps 44A1, 44A6 and 445D. These steps, in sequence, set the 4-UP line count, store the 4-UP line count, and set a 4-UP Scan Command signal. If the scan mode is not 4-UP, then the program flow is through steps 44C2, 44C7 and 4460. These steps, in sequence, set the standard line count, store the standard line count, and set a normal scan mode. After either of the scan mode signals are set, they are outputted by step 4462. If the output is the 4-UP scan command, the signal sets the 4-UP latch 149 in FIG. 6. If the output is the normal scan mode, the command resets latch 149 in FIG. 6.

Next, the scan routine calls the Carriage Start routine at step 44D8. The Carriage Start routine has just been described in reference to FIG. 12. When the Carriage Start routine is completed, program control returns to the scan routine at step 4899 which is a wait macro waiting for the Scan End of Line signal.

The Scan EOL signal is generated by the decode 154 (FIG. 6). Each time the wait macro 4899 detects the Scan EOL, program flow passes to the increment line counter step 49D7. Decision step 49DD then checks to see if the line count corresponds to the line counts previously stored either during step 44A6 or 44C7. If the line count is not equal to the stored count, the program flow loops back to the wait macro 4899 to wait for the next Scan End of Line signal. If it is equal to the stored line count, then the program flow passes to steps 49E1 and 49E3. These steps set and output the last line command which is used to enable AND 176 in FIG. 9. AND 176 is enabled so that it will monitor for the next End of Line signal indicating, in effect, the end of page. When AND 176 has an output, it resets the CST latch in FIG. 9.

The program flow in FIG. 13 finishes the scan routine by passing to the actuate macro 44F6 which calls the Carriage Return routine. The Carriage Return routine is not shown. It consists simply of generating a carriage return command for the motor control and modulating gating 96 in FIG. 4. This signals the motor control 96 to reverse the direction of the carriage until the carriage again crosses the home sensor. Then the carriage is stopped to await the next carriage start.

Figure 14:
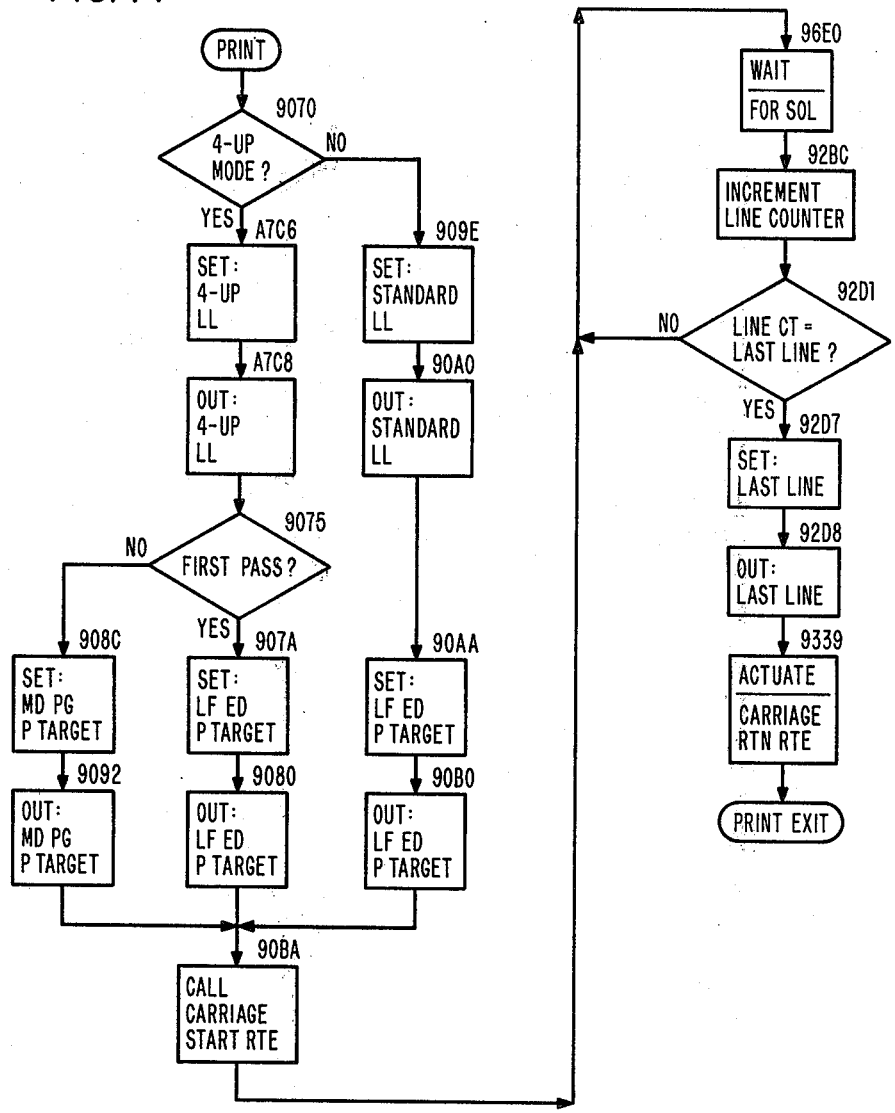
FIG. 14 shows the flowchart of the Print program routine.

Now referring to FIG. 14, the flowchart of the print routine is shown. The print routine generates commands used by the print data control which is shown in detail in FIG. 8. The exact program steps to implement the print routine are in Table IV of Appendix B.

The print routine starts at decision step 9070 where it checks to see whether the required print operation is 4-UP or normal. If the print operation is normal, program control branches to steps 909E and 90A0 where it sets and outputs a standard line length command. The standard line length command is used to reset the line length latch 168 (FIG. 8). After setting the line length latch, the print routine at steps 90AA and 90B0 sets and outputs a left-edge print target to target register 132 (FIG. 5).

If the print operation is 4-UP, program flow branches to steps A7C6 and A7C8. These steps set and output the 4-UP line length command. This command sets line length latch 168 (FIG. 8). Next, decision step 9075 checks to see whether it is the first printing pass (quadrants A and B of FIG. 1). If printing the A and B quadrants, program control branches to steps 907A and 9080 where it sets and outputs a left-edge print target to the target register 132 (FIG. 5). The print target is set and outputted in two eight-bit bytes, a high byte and a low byte. Only the first set step and the last output step are represented in the flowchart of FIG. 14. If the print operation is printing the second pass (the C and D quadrants of FIG. 1), then program control branches from decision 9075 to steps 908C and 9092. These steps set and output the mid-page print target to the target register 132 (FIG. 5).

After the target register 132 of FIG. 5 has been set up, and after the line length latch 168 of FIG. 8 has been set up, program flow passes to the call carriage start step 9224. The Carriage Start routine of FIG. 12 is called. When completed, the Carriage Start routine passes program control back to the wait macro at step 96E0 in the print routine of FIG. 14. Wait macro 96E0 is looking for the Start of Line (SOL) signal from FIG. 8. When it receives the SOL at the beginning of each line during a print operation, it increments the line counter in the processor. After the increment step 92BC, the program checks to determine whether the line count corresponds to a predetermined last line count for the page. If it does not, program flow branches back in a loop to the wait macro 96E0.

As each SOL signal is received from FIG. 8 during the printing of each line, the program will check to determine whether it is the last line of the page. When the decision at step 92D1 is satisfied indicating it is the last line, program flow passes to steps 92D7 and 92D8. These steps set and output the last line command. The last line command is used to enable AND gate 176 of FIG. 9 so that at the next EOL signal, the CST latch is reset indicating an end of page. Thereafter, the print routine is completed by actuating the Carriage Return routine at step 9339. The carriage return routine will reverse the carriage and send it back to the home position to await the next carriage start command. If it is a 4-UP print and only one pass of the printing operation has completed, then the print routine will repeat except branching from step 9075 to step 908C. In this manner, quadrants C and D of FIG. 1 may be printed.

Figure 15:
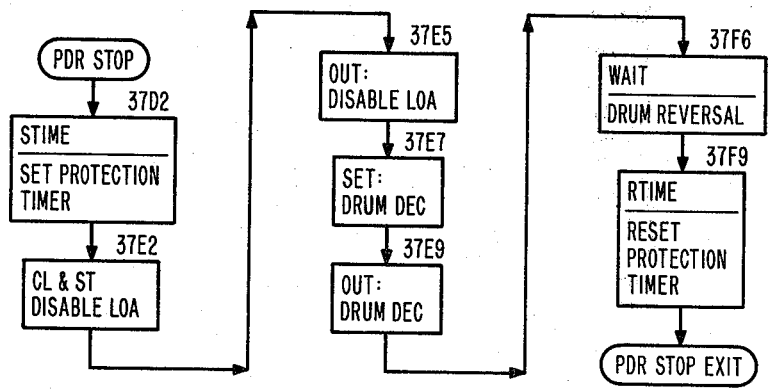
FIG. 15 shows the flowchart of the Print Drum Stop program routine.

In FIG. 15, the program flow for generation of the commands used in stopping the print drum is shown. The program instructions represented by the flowchart in FIG. 15 are listed in Table V in Appendix B. At the beginning of the Print Drum (PDR) Stop routine, a STIME macro 37D2 sets a protection timer. This timer allows six seconds for the drum stop to be accomplished.

After the timer is set, the program at step 37E2 clears and stores a disable LOA control byte. At program step 37E5, the disable LOA command is outputted through register 184 (FIG. 10) to the reset side of latch 130 in FIG. 5.

The program then sets a drum decelerate command at step 37E7. This decelerate command is outputted again through registers 184 in FIG. 10 to set latch 69 in FIG. 3. Thus far, the Drum Stop routine has disabled the lost once-around check and initiated the deceleration of the print drum motor.

Next, wait routine 37F6 waits for a drum reversal signal from direction detector 71 in FIG. 3. This drum reversal signal is passed to the microprocessor via the input registers 183 (FIG. 10).

The reset protection timer macro, RTIME, at 37F9 monitors to see that this stop drum sequence is completed within six seconds. If it is not accomplished within six seconds, the RTIME macro will initiate a recovery procedure. After the RTIME macro, the stop routine exits.

While we have illustrated and described the preferred embodiments of our invention, it is understood that we do not limit ourselves to the precise constructions herein disclosed and the right is reserved to all changes and modifications coming within the scope of the invention as defined in the appended claims.

APPENDIX A

| INSTRUCTION MNEMONIC | HEX VALUE | NAME | DESCRIPTION |
|---|---|---|---|
| AB(L) | A4 | Add Byte (Low) | Adds addressed operand to LACC (8-bit op.) |
| AI(L) | AC | Add Immed. (Low) | Adds address field to LACC (16-bit op.) |
| AR | DN | Add Reg. | Adds N-th register contents to ACC (16-bit op.) |
| A1 | 2E | Add One | Adds 1 to ACC (16-bit op.) |
| B | 24,28,2C | Branch | Branch to LSB (+256,−256,±0) |
| BAL | 30–33 | Branch And Link | Used to call subroutines (PC to Reg. 0, 1, 2, or 3) |
| BE | 35,39,3D | Branch Equal | Branches if EQ set (See B) |
| BH | 36,3A,3E | Branch High | Branch if EQ and LO are reset (See B) |
| BNE | 34,38,3C | Branch Not Equal | Branch if EQ reset (See B) |
| BNL | 37,3B,3F | Branch Not Low | Branch if LO reset (See B) |
| BR | 20–23 | Branch Reg. | See RTN |
| CB(L) | A0 | Compare Byte (Low) | Addressed byte compared to LACC (8-bit op.) |
| CI(L) | A8 | Compare Immed. (Low) | Address field compared to LACC (8-bit op.) |
| CLA | 25 | Clear Acc. | ACC reset to all zeroes (16-bit op.) |
| GI | A9 | Group Immed. | Selects one of 16 register groups (also controls interrupts) |
| IC | 2D | Input Carry | Generate carry into ALU |
| IN | 26 | Input | Read into LACC from addressed device (8-bit op.) |
| J | 0N,1N | Jump | Jump (forward or back) to PC(15-4),N |
| JE | 4N,5N | Jump Equal | Jump if EQ set (See J) |
| JNE | 6N,7N | Jump Not Equal | Jump if EQ reset (See J) |
| LB(L) | A6 | Load Byte (L) | Load addressed byte into LACC (8-bit op.) |
| LI | AE | Load Immed. | Load address field into LACC |
| LN | 98–9F | Load Indirect | Load byte addressed by reg. 8-F into LACC (8-bit op.) |
| LR | EN | Load Register | Load register N into ACC (16-bit op.) |
| LRB | FN | Load Reg./Bump | Load reg. N into ACC and increment; ACC to Reg. N (N=4–7,C–F) (16-bit op.) |
| LRD | FN' | Load Reg./Decr. | Load reg. N into ACC and decrement; ACC to Reg. N (N=0–3,8–B) (16-bit op.) |
| NB(L) | A3 | And Byte (Low) | AND addressed byte into LACC (8-bit op.) |
| NI(L) | AB | And Immed. (Low) | AND address field into LACC (8-bit op.) |
| OB(L) | A7 | Or Byte (Low) | OR addressed byte into LACC (8-bit op.) |
| OI(L) | AF | Or Immed. (Low) | OR address field into LACC (8-bit op.) |
| OUT | 27 | Output | Write LACC to addressed device |
| RTN | 20–23 | Return | Used to return to calling program (See BAL) |
| SB(L) | A2 | Subtract Byte (Low) | Subtract addressed byte from LACC (8-bit op.) |
| SHL | 2B | Shift Left | Shift ACC one bit left (16-bit op.) |
| SHR | 2F | Shift Right | Shift ACC one bit right (16-bit op.) |
| SI(L) | AA | Subtract Immed. (Low) | Subtract address field from LACC (16-bit op.) |
| SR | CN | Subtract Reg. | Subtract reg. N from ACC (16-bit op.) |
| STB(L) | A1 | Store Byte (Low) | Store LACC at address (8-bit op.) |
| STN | B8–BF | Store Indirect | Store LACC at address in Reg. 8-F |
| STR | 8N | Store Reg | Store ACC in Reg. N (16-bit op.) |
| S1 | 2A | Subtract One | Subtract 1 from ACC (16-bit op.) |

APPENDIX A-continued

| | | | |
|---|---|---|---|
| TP | 9N | Test/Preserve | Test N-th bit in LACC (N=0-7) |
| TR | BN | Test/Reset | Test and reset N-th bit in LACC |
| TRA | 29 | Transpose | Interchange HACC and LACC |
| XB(L) | A5 | XOR Byte (Low) | Exclusive-OR addressed byte into LACC (8-bit op.) |
| XI(L) | AD | XOR Immed. (Low) | Exclusive-OR address field into LACC (8-bit op.) |

Notes:
ACC (Accumulator) is 16-bit output register from arithmetic-logic unit
- LACC signifies herein the low ACC byte; HACC, the high byte
- all single byte operations are into low byte
- register operations are 16-bit (two-byte)
- 8-bit operations do not affect HACC
EQ (equal) is a flag which is set:
if ACC=0 after register AND or XOR operations;
if ACC (low byte)=0 after single byte operations;
if a tested bit is 0;
if bits set by OR were all 0's;
if input carry = 0;
if compare operands are equal;
if bit shifted out of ACC = 0;
if 8th bit of data during IN or OUT = 0.
LO (low) is a flag which is set: (always reset by IN, OUT, IC)
if ACC bit 16=1 after register operation;
if ACC bit 8=1 after single byte operations;
if logic operation produces all ones in LACC;
if all bits other than tested bit = 0;
if ACC=0 after shift operation;
if compare operand is greater than ACC low byte.

| MACRO MNEMONIC | NAME | DESCRIPTION |
|---|---|---|
| BC | Branch on Carry | Branches if carry is set |
| BCT | Branch on Count | Reg. decremented and branch if not zero result |
| BHA | Branch on High ACC | Used after compare |
| BL | Branch on Low | Branches if LO is set |
| BLA | Branch on Low ACC | See BNC; used after compare |
| BNC | Branch Not Carry | Branches if carry is reset |
| BNLA | Branch on Not Low ACC | See BC; used after compare |
| BNZ | Branch Not Zero | Branches if previous result was not zero |
| BR | Branch via Register | Same as RTN instruction |
| BU | Branch Unconditionally | Same as BAL instruction |
| CIL | Compare Immed. Low | Uses low byte of indicated constant in CI address field |
| DC | Define Constant | Reserves space for constant |
| EXP2 | Express In powers of 2 | Opcode set to binary |
| JC | Jump on Carry | See BC |
| JL | Jump on Low | See BL |
| JNC | Jump on No Carry | See BNC |
| JNH | Jump Not High | See BNH |
| LA | Load Address | Generates sequence LIH, TRA, LIL |
| LBD | Load Byte Double | Bytes at addr. and addr. +1 to ACC |
| LID | Load Immed. Double | Same as LA |
| LIH | Load Immed. High | Uses high byte of constant in LI address field |
| LIL | Load Immed. Low | Uses low byte of constant in LI address field |
| NOP | No Operation | Dummy instruction-skipped |
| RAL | Rotate ACC Left | Generates sequence SHL, IC, A1 |
| SCTI | Set Count Immed. | Generates CLA, LI, STR |
| SHLM | Shift Left Multiple | Shifts specified number of times to left |
| SHRM | Shift Right Multiple | Shifts specified number of times to right |
| SRG | Set Register Group | Same as GI |
| STDB | Store Byte Double | ACC to addr. +1 and addr. |
| TPB | Test & Preserve Bit | Generates sequence LB, TP |
| TRB | Test & Reset Bit | Generates sequence LB, TR, STB |
| TRMB | Test & Reset | Same as TRB but specifies multiple |

APPENDIX A-continued

| | Multiple Bits | bits |
|---|---|---|
| TRMR | Test/Reset Mult. Bits in Reg. | Generates LR, NI, STR |
| TS | Test and Set | Same as OI instruction |
| TSB | Test & Set Byte | Same as TS but byte is specified in addition to bit |
| TSMB | Test & Set Multiple Bytes | Same as TS but specifies multiple Bits |
| TSMR | Test & Set Mult. Bits in Reg. | Generates LR, OI, STR |
| LZI | Zero & Load Immed. | Generates CLA, LI |

NOTES:
(Label) DC *causes the present location (*) to be associated with the label.
L and H, in general, are suffixes indicating low or high byte when 16 bit operands are addressed.

APPENDIX B

TABLE I: PDR START

| COMMENT LOC OBJ | SOURCE STATEMENT | |
|---|---|---|
| | ORG | CMDST |
| SET PROTECTION TIMER | | |
| | STIME | CDTSRPD1,6,CDMSG17 |
| 3702 A98E | GI | CDTSGOE+CDMIM80 |
| 3704 AEFF | LIH | X'FFFF'-(6*8) |
| 3706 29 | TRA | |
| 3707 AECF | LIL | X'FFF'-(6*8) |
| 3709 84 | STR | CDTSRPD1 |
| 370A A6DC | LB | CDTSBC2 |
| 370C AF01 | TS | CDTSIC20 |
| 370E A1DC | STB | CDTSBC2 |
| 3710 A917 | GI | CDMSG17+CDMIM00 |
| 3717 A6A7 | | |
| SET & OUT DRUM ACC | | |
| 3723 AE80 | LI | P(CDPDIC97) |
| 3725 2719 | OUT | CDPDAC9 |
| WAIT FOR PD UP-TO-SPEED | | |
| | WAIT | PD |
| 3727 317E5A | BAL | CDPDRPTR,CMPDEND |
| WAIT 500 MSEC | | |
| | WAIT | PD,T=(0,500) |
| 372A A98F | GI | CDTSFOF+CDMIM80 |
| 372C AEFF | LIH | X'FFFF'-(500/10) |
| 372E 29 | TRA | |
| 372F AECD | LIL | X'FFFF'-(500/10) |
| 3731 86 | STR | CDTSRPD0 |
| 3732 A6EC | LB | CDTSBC3 |
| 3734 AF40 | TS | CDTSIC36 |
| 3736 A1EC | STB | CDTSBC3 |
| 3738 A917 | GI | CDMSG17+CDMIM00 |
| 373A 317E5A | BAL | CDPDRPTR,CMPDEND |
| SET & OUT REFERENCE ENABLE | | |
| 375C AE08 | LI | P(CDPDICA3) |
| 375E 271A | OUT | CDPDACA |
| WAIT FOR PD ZERO REFERENCE | | |
| | WAIT | PD |
| 3760 317E5A | BAL | CDPDRPRT,CMPDEND |
| SET & OUT ENABLE LOA | | |
| 3763 AE20 | LI | P(CDPDICA5) |
| 3765 271A | OUT | CDPDACA |
| RESET PROTECTION TIMER | | |
| | RTIME | CDTSRPD1,CDMSG17 |
| 376B A98E | GI | CDTSGOE+CDMIM80 |
| 376D A6DC | LB | CDTSBC2 |
| 376F B0 | TR | CDTSIC20 |
| 3770 A1DC | STB | CDTSBC2 |
| 3772 25 | CLA | |
| 3773 84 | STR | CDTSRPD1 |
| RETURN TO SUPERVISOR | | |
| | FIN | END |

APPENDIX B

TABLE II: CARRIAGE START

| COMMENT LOC OBJ | SOURCE STATEMENT | |
|---|---|---|
| IMSTCS | DC | * |
| IF SCAN MODE | | |
| | TPB | IDTDBC3,IDTDIC31 |

APPENDIX B-continued
TABLE II: CARRIAGE START

```
50B9 A60F+
50BB 91 +
50BC 3DCF              BZ    IMLSES11
THEN SET & OUT SCN
50BE AE80              LI    P(IDLSIC07)
50C0 27B0              OUT   IDLSAC0
IF 4-UP MODE
                       TPB   IDSNBMS,IDSNIMS6
50C2 A626+
50C4 96 +
50C5 69                JNZ   IMLSES10
THEN SET 2X SCAN SPEED CODE
50C6 AE13              LI    P(IDLSIC04,IDLSIC01,
                               IDLSIC00)
50C8 0B                J     IMLSES0
ELSE
IMLSES10               DC    *
SET NORMAL SCAN SPEED CODE
50C9 AE12              LI    P(IDLSIC04,IDLSIC01)
IMLSES0                DC    *
OUT SCAN SPEED CODE
50CB 27B0              OUT   IDLSAC0
50CD 2CED              B     IMLSES1
ELSE
IMLSES11               DC    *
SET & OUT PRT
50CF AE40              LI    P(IDLSIC06)
50D1 27B0              OUT   IDLSAC0
SET & OUT NORMAL PRINT SPEED CODE
50E3 AE11              LI    P(IDLSIC04,IDLSIC00)
50E5 0B                J     IMLSES20
IMLSES20               DC    *
50EB 27B0              OUT   IDLSAC0
IMLSES1                DC    *
SET & OUT CARRIAGE START
51ED AE80              LI    P(IDSCIC77)
5119 2737              OUT   IDSCAC7
IMLSES21               DC    *
WAIT FOR BOL RUN
5177 331F              BAL   IDLSRUT,IMLSUTS6
INCREMENT LINE COUNTER
517E FF                LRB   IDLSRLC
IMLSES31               DC    *
UNTIL LINE COUNT = TOP OF PAGE
518A 25                CLA
518B A68E              LB    IDLSBCT
518D CF                SR    IDLSRLC
518E 3C77              BNE   IMLSES21
SET & OUT TOP OF PAGE
5190 AEA8              LI    P(IDPCIC87, IDPCIC85,
                               IDPCIC83)
5192 2708              OUT   IDPCAC8
RETURN
51E0 21                RTN   IDLSRCS
```

APPENDIX B
TABLE III: SCAN

```
COMMENT
LOC OBJ                      SOURCE STATEMENT
IF 4-UP MODE
                       TPB   IDSNBMS,IDSNIMS3
4459 A626+
445B 93 +
445C 44                JZ    IMSTSE2
THEN SET & STORE 4-UP LINE COUNT
                       LA    1119
44A1 AE04+
44A3 29 +
44A4 AE5F+
44A6 8F                STR   IDSTRSE
SET 4-UP SCAN
445D AE80              LI    P(IDSCIC67)
445F 02                J     IMSTSE0
ELSE
IMSTSE2                DC    *
SET & STORE STANDARD LINE COUNT
                       LA    2239
4464 AE08+
44C4 29 +
44C5 AEBF+
44C7 8F                STR   IDSTRSE
SET NORMAL SCAN
4460 AE40              LI    P(IDSCIC66)
IMSTSE0                DC    *
OUT 4-UP OR NORMAL SCAN
4462 2736              OUT   IDSCAC6
IMSTSE12               DC    *
CALL CARRIAGE START
44D8 333C              BAL   IDLSRCS,IMLSCS
IMSTLL11               DC    *
WAIT FOR SCN EOL
                       WAIT  SC,NM,X'20'
+$CA$5                 DC    *
4899 AE5F+             LI    95
489B 29 +              TRA
489C AE0D+             LI    13
489E 300A+             BAL   IDSTRVCT,IMTDSTND
INCREMENT LINE COUNTER
                       GRP   LS
```

APPENDIX B-continued
TABLE III: SCAN

| | | | |
|---|---|---|---|
| 49D7 A9C4+ | | GI | IDLSG04+X'C0' |
| 49D9 FF | | LRB | IDLSRLC |
| | | GRP | ST |
| 49DA A9C3+ | | GI | IDSTG03+X'C0' |

IF LINE COUNT NOT EQUAL TO STORED LINE COUNT

| 49DC CF | | SR | IDSTRSE |

THEN GO TO WAIT FOR SCN EOL

| | | BNE | IMSTLL11 |
| 49DD 3C99 | | | |

ELSE SET & OUT LAST LINE

| 49E1 AE54 | | LI | P(IDSCIC76,IDSCIC74, IDSCIC72) |
| 49E3 2737 | | OUT | IDSCAC7 |

ACTUATE CARRIAGE RETURN ROUTINE

| | | FIN | ST |
| 44F6 AE02+ | | LI | IDTDKR02 |
| 44F8 300A+ | | BAL | IDSTRVCT,IMTDSTND |

SCAN EXIT

APPENDIX B
TABLE IV: PRINT

COMMENT
LOC OBJ      SOURCE STATEMENT

IF 4-UP MODE

| | | TPB | IDPNBF1,IDPNIF14 |
| 9070 A625+ | | | |
| 9072 94 + | | | |
| 9073 3D9E | | BZ | IMPTDB01 |

THEN SET & OUT 4-UP LINE LENGTH

| A7C6 AE4C | | LI | P(IDPCICA6,IDPCICA3, IDPCICA2) |
| A7C8 270A | | OUT | IDPCACA |

IF FIRST PASS

| | | TPB | IDPNBE5,IDPNIE56 |
| 9075 A63D+ | | | |
| 9077 96 + | | | |
| 9078 3C8C | | BNZ | IMPTDB02 |

THEN SET & OUT LEFT EDGE P TARGET HIGH BYTE

| 907A AE08 | | LI | P1(IDDRICB3) |
| 907C 272B | | OUT | IDDRACB |

SET & OUT LEFT EDGE P TARGET LOW BYTE

| 907E AE12 | | LI | P1(IDDRICA4,IDDRICA1) |
| 9080 272A | | OUT | IDDRACA |
| 908A 2C9C | | B | IMPTDB03 |

ELSE

| IMPTDB02 | | DC | * |

SET & OUT MID PAGE P TARGET HIGH BYTE

| 908C AE0B | | LI | P1(IDDRICB3,IDDRICB1, IDDRICB0) |
| 908E 272B | | OUT | IDDRACB |

SET & OUT MID PAGE P TARGET LOW BYTE

| 9090 AE72 | | LI | P1(IDDRICA6,IDDRICA5, IDDRICA4,IDDRICA1) |
| 9092 272A | | OUT | IDDRACA |
| IMPTDB03 | | DC | * |
| 909C 2CBA | | B | IMPTDB04 |

ELSE

| IMPTDB01 | | DC | * |

SET & OUT STANDARD LINE LENGTH

| 909E AE6C | | LI | P(IDPCICA6,IDPCICA5, IDPCICA3,IDPCICA4) |
| 90A0 270A | | OUT | IDPCACA |

SET & OUT LEFT EDGE P TARGET HIGH BYTE

| 90AA AE0F | | LI | P1(IDDRICB3,IDDRICB2, IDDRICB1,IDDRICB0) |
| 90AC 272B | | OUT | IDDRACB |

SET & OUT LEFT EDGE P TARGET LOW BYTE

| 90AE AE14 | | LI | P1(IDDRICA4,IDDRICA2) |
| 90B0 272A | | OUT | IDDRACA |

CALL CARRIAGE START

| 9226 3019+ | | BAL | IDLSRCS,IMLSCS |
| IMPTSP0B | | DC | * |

WAIT FOR SOL

| | | WAIT | PT,NM,X'A0' |
| +$CA$17 | | DC | * |
| 96E0 AE5F+ | | LI | 95 |
| 96E2 29 + | | TRA | |
| 96E3 AE05+ | | LI | 5 |

APPENDIX B-continued
TABLE IV: PRINT

| 96E5 3019+ | | BAL | IDPTRVCT,IMTDPTND |

INCREMENT LINE COUNTER

| 92BC FF | | LRB | IDPTRDC |

UNTIL LINE COUNT = LAST LINE

| 92D1 EF | | LR | IDPTRDC |
| 92D2 CA | | SR | IDPTRDD |
| | | BL | IMPTSP0B |
| 92D3 3FD7+ | | | |
| 92D5 2C44+ | | | |
| IMPTSP0C | | DC | * |

SET & OUT LAST LINE

| 92D7 AE54 | | LI | P(IDPTIC86,IDPTIC84, IDPCIC82) |
| 92D8 2708 | | OUT | IDPCAC8 |

ACTUATE CARRIAGE RETURN

| | | FIN | PT |
| 9339 AE02+ | | LI | IDTDKR02 |
| 933B 3019+ | | BAL | IDPTRVCT,IMTDPTND |

PRINT EXIT

APPENDIX B
TABLE V: PDR STOP

COMMENT
LOC OBJ      SOURCE STATEMENT

| | | ORG | CMPDSP |

SET PROTECTION TIMER

| | | STIME | CDTSRPD1,6,CDMSG17 |
| 37D2 A98E | | GI | CDTSGOE+CDMIM80 |
| 37D4 AEFF | | LIH | X'FFFF'-(6*8) |
| 37D6 29 | | TRA | |
| 37D7 AECF | | LIL | X'FFFF'-(6*8) |
| 37D9 84 | | STR | CDTSRPD1 |
| 37DA A6DC | | LB | CDTSBC2 |
| 37DC AF01 | | TS | CDTSIC20 |
| 37DE A1DC | | STB | CDTSBC2 |
| 37E0 A917 | | GI | CDMSG17+CDMIM00 |

SET & OUT DECELERATE COMMAND

| 37E7 AE40 | | LI | P(CDPDIC96) |
| 37E9 2719 | | OUT | CDPDAC9 |

SET & OUT REF ENABLE

| 37EB AE08 | | LI | P(CDPDICA3) |
| 37ED 271A | | OUT | CDPDACA |

WAIT ON DR REVERSAL

| | | WAIT | PD |
| 37F6 317E5A | | BAL | CDPDRPTR,CMPDEND |

RESET PROTECTION TIMER

| | | RTIME | CDTSRPD1,CDMSG17 |
| 37F9 A98E | | GI | CDTSGOE+CDMIM80 |
| 37FB A6DC | | LB | CDTSBC2 |
| 37FD B0 | | TR | CDTSIC20 |
| 37FE A1DC | | STB | CDTSBC2 |
| 3800 25 | | CLA | |
| 3801 84 | | STR | CDTSRPD1 |
| 3802 A917 | | GI | CDMSG17+CDMIM00 |

RETURN TO SUPERVISOR

| | | FIN | END |

What is claimed is:

1. In facsimile apparatus having a transmitting station for transmitting a scanned image and a receiving station for receiving the transmitted image, apparatus for producing multiple image print copies at the receiver comprising:
   means for scanning original documents serially to produce a series of scanned images from a series of original documents;
   means for reducing each scanned image in two dimensions before transmission;
   means at the receiver for printing the reduced images successively; and
   means for controlling said printing means to print the successive reduced images at separate locations on one copy document.

2. The apparatus of claim 1 wherein said controlling means starts said printing means at a separate predetermined location on the copy document for each reduced scanned image so that each image is printed at a separate location on the copy document.

3. The apparatus of claim 1 wherein said controlling means starts said printing means at a predetermined horizontal and vertical location on the copy document for each reduced scanned image in accordance with the horizontal and vertical reduction factor so that each of the images is printed on separate portions of the single copy document.

4. The apparatus of claim 1 wherein said control means comprises:
   means for starting said print means at a first predetermined location on the copy document during a first print pass down the copy document; and
   means for starting said print means at a second predetermined location on the copy document during a second print pass down the copy document, whereby in two passes one reduced image is printed on a first portion of the document and a subsequent reduced image is printed on another portion of the document.

5. The apparatus of claim 1 wherein said reducing means reduces each of four scanned images approximately 50% in each dimension.

6. The apparatus of claim 5 wherein said control means comprises:
   means for starting said print means at the left edge of the copy document during a first print pass down the copy document when the first two scanned images are printed; and
   means for starting said print means at the horizontal mid-point of the copy document during a second print pass down the copy document when the next two scanned images are printed, whereby in two passes the first two images are printed on the left half of the document and the next two images are printed on the right half of the document.

7. The apparatus of claim 5 wherein said reducing means comprises:
   means for changing the size of the scan picture element in one dimension by a factor of two; and
   means for discarding every other scan picture element in the dimension transverse to the dimension in which the scan picture element is changed in size.

8. The apparatus of claim 7 wherein said control means comprises:
   means for starting said print means at the left edge of the copy document during a first print pass down the copy document when the first two scanned images are printed; and
   means for starting said print means at the horizontal mid-point of the copy document during a second print pass down the copy document when the next two scanned images are printed, whereby in two passes the first two images are printed on the left half of the document and the next two images are printed on the right half of the document.

9. In facsimile apparatus having means for scanning a plurality of source documents, means for transmitting a facsimile image of each source document, means for receiving each facsimile image and print means for printing each facsimile image, apparatus for controlling said facsimile apparatus to print facsimile images of four source documents on one print page at the receiver, said control apparatus comprising:
   means for reducing the facsimile image of each of four source documents substantially 50% in each of the horizontal and vertical dimensions;
   means for starting said print means at one edge of the print page during a first print pass across the page when the facsimile images of the first two source documents are being printed; and
   means for starting said print means at mid-page during a second print pass across the print page when the facsimile images of the last two source documents are being printed, whereby in two passes a 4-UP copy of the four source documents is printed on the print page at the receiver.

10. Method for controlling a facsimile system having a scanner for converting a source document into video data and a printer for printing a copy document from the video data, said method controlling said scanner and said printer so that more than one source document is printed on a single copy document, and said method comprising the steps of:
    scanning a plurality of source documents to generate video data representing picture element samples of the image on each document;
    reducing the video data representative of the image of each source document;
    printing the reduced video data for each document whereby a reduced image of the source document is printed in a reduced space on the copy document; and
    starting said printing step for the video data representing each source document at a predetermined location on the copy document whereby a plurality of source documents are printed in reduced size on a single copy document.

11. The method of claim 10 wherein said starting step comprises the steps of:
    starting the printing step relative to an edge of the copy document to print at least one of the reduced images of the source documents; and
    starting the printing step relative to a predetermined distance from an edge of the copy document to print at least one other of the reduced images of the source documents.

12. The method of claim 10 wherein said reducing step reduces the video data by increasing the speed of the scanning step so that a larger picture element sample is represented by each portion of video data.

13. The method of claim 10 wherein said reducing step reduces the video data by discarding the video data from every other picture element sample during the scanning step.

14. The method of claim 10 wherein said reducing step reduces the video data representation of the image in two dimensions and comprises the steps of:
    increasing the speed of the scanning step so that a larger picture element sample is represented by each portion of video data; and
    discarding the video data from every other picture element sample during the scanning step.

15. The method of claim 14 wherein said starting step comprises the steps of:
    starting the printing step at one reference edge of the copy document during a first print pass across the copy document to print at least one of the reduced images of the source documents; and starting the printing step a predetermined distance from said reference edge during a second print pass across the copy document to print at least one other of the reduced images of the source documents.

16. Method of producing a 4-UP copy of four original documents in a facsimile system having a scanner and printer, said method comprising the steps of:
scanning each of the four original documents and generating a facsimile image signal of each original;
reducing the image signal of each original so that the signal represents at least 50% image reduction in both the horizontal and vertical dimensions; and
printing from the image signals the reduced facsimile image of each original in one of the four quadrants of the copy whereby the copy contains all four originals with each original reduced one-fourth in size.

17. The method of claim 16 wherein said reducing step comprises the steps of:
increasing the size in the scan pass direction of each picture element sample taken by said scanning step in generating the facsimile image signal; and
discarding every other picture element sample taken during said scanning step.

18. The method of claim 17 wherein said printing step comprises the steps of:
printing the reduced facsimile images of two of the originals on one half of the copy during a first print pass across the copy; and
printing the reduced facscimile images of the other two originals on the other half of the copy during a second print pass across the copy.

19. The method of claim 17 and, in addition, the steps of:
starting the printing step relative to an edge of the copy to print the reduced facsimile images of two of the originals on one half of the copy; and
starting the printing step relative to a predetermined distance from an edge of the copy to print the reduced facsimile images of the other two originals on the other half of the copy.

* * * * *